US012451300B2

(12) United States Patent
Knapp et al.

(10) Patent No.: US 12,451,300 B2
(45) Date of Patent: Oct. 21, 2025

(54) DISCONNECT DEVICE WITH INTERLOCK MECHANISM

(71) Applicant: MERSEN USA EP Corp., Boonton, NJ (US)

(72) Inventors: Mathew Knapp, Marblehead, MA (US); Tyler Larson, Middleton, MA (US); Brian A. Betts, Hampton, NH (US); Francesco A. Nania, Clinton, MA (US); Roy Ball, Coral Springs, FL (US)

(73) Assignee: MERSEN USA EP CORP., Boonton, NJ (US)

( * ) Notice: Subject to any disclaimer, the term of this patent is extended or adjusted under 35 U.S.C. 154(b) by 286 days.

(21) Appl. No.: 18/011,917

(22) PCT Filed: Jul. 2, 2021

(86) PCT No.: PCT/US2021/040292

§ 371 (c)(1),
(2) Date: Dec. 21, 2022

(87) PCT Pub. No.: WO2022/010780

PCT Pub. Date: Jan. 13, 2022

(65) Prior Publication Data

US 2023/0245839 A1 Aug. 3, 2023

Related U.S. Application Data

(60) Provisional application No. 63/048,285, filed on Jul. 6, 2020.

(51) Int. Cl.
*H01H 9/10* (2006.01)
*H01H 1/20* (2006.01)
(Continued)

(52) U.S. Cl.
CPC .......... *H01H 9/104* (2013.01); *H01H 1/2025* (2013.01); *H01H 71/1009* (2013.01); *H01H 85/0241* (2013.01)

(58) Field of Classification Search
CPC ........ H01H 71/00; H01H 71/02; H01H 71/04; H01H 71/08; H01H 71/10; H01H 71/1009;
(Continued)

(56) References Cited

U.S. PATENT DOCUMENTS 5,168,137 A 12/1992 Hufnagel et al.
5,606,299 A * 2/1997 Innes ................ H01H 71/0228 335/132

(Continued)

FOREIGN PATENT DOCUMENTS

DE 297 06 429 U1 6/1997
DE 297 14 133 U1 10/1997
EP 1 901 320 A1 3/2008

OTHER PUBLICATIONS

International Search Report from corresponding International Patent Application No. PCT/US2021/040292, dated Jan. 4, 2022.

(Continued)

*Primary Examiner* — Anthony R Jimenez
(74) *Attorney, Agent, or Firm* — Renner, Otto, Boisselle & Sklar, LLP

(57) ABSTRACT

A fusible disconnect switch includes a switch housing, and a first fuse contact member and a second fuse contact member coupled to the switch housing, each of the first fuse contact member and the second fuse contact member configured to engage and complete an electrical connection through an overcurrent protection fuse. The fusible disconnect switch further includes a switch contact including a parallel contact configuration. An interlock is operatively coupled to the first fuse contact member and a switch that
(Continued)

operates the switch contact, the interlock configured to inhibit movement of the switch from the OFF position to the ON position when the first fuse contact member is unsecured to the switch housing, and inhibit movement of the first fuse contact member relative to the switch housing when the switch is in the ON position.

19 Claims, 11 Drawing Sheets

(51) Int. Cl.
*H01H 71/10* (2006.01)
*H01H 85/02* (2006.01)

(58) Field of Classification Search
CPC ........... H01H 71/1018; H01H 71/1027; H01H 85/00; H01H 85/02; H01H 85/0241; H01H 85/04; H01H 85/20; H01H 2009/02; H01H 9/104; H01H 9/16; H01H 9/20; H01H 9/24; H01H 1/12; H01H 1/14; H01H 1/20; H01H 1/2025; H01H 1/58; H01H 9/10
USPC ........................................................ 200/50.07
See application file for complete search history.

(56) References Cited

U.S. PATENT DOCUMENTS

2006/0055498 A1 3/2006 Darr et al.
2010/0014273 A1 1/2010 Darr
2011/0163836 A1 7/2011 Darr et al.

OTHER PUBLICATIONS

Written Opinion from corresponding International Patent Application No. PCT/US2021/040292, dated Jan. 4, 2022.
Office Action issued in related European Patent Application No. 21746295.1 dated May 6, 2025.
Office Action issued in related Canadian Patent Application No. 3,183,972 dated Jun. 6, 2025.

* cited by examiner

DISCONNECT DEVICE WITH INTERLOCK MECHANISM

FIELD OF THE INVENTION

The present invention relates to disconnect devices, and more particularly, to fusible disconnect devices that include switching contacts having a parallel configuration, an overload device, and an interlock that selectively enables/inhibits removal/replacement of a fuse and selectively enables/inhibits operation of a switch that controls the switching contacts. The invention also relates to modular disconnect devices, including disconnect devices in which characteristic features of the disconnect device are implemented in dedicated modules, whereby a disconnect device having specific feature set can be created by connecting together two or more modules that have the desired features.

BACKGROUND OF THE INVENTION

Compact fusible disconnect devices have been recently developed that advantageously combine switching capability and enhanced fusible protection in a single, compact housing. As compared to conventional arrangements in which fusible devices are connected in series with separately packaged switching elements, such fusible disconnect devices can provide substantial reduction in size and cost while providing comparable, if not superior, circuit protection performance.

For example, fusible disconnect devices accommodate fuses without involving a separately-provided fuse holder, and also establish electrical connection without fastening of the fuse to the line and load side terminals. Therefore, fusible disconnect devices provide further benefits by eliminating certain components of conventional constructions and providing lower cost, yet easier to use fusible circuit protection products. While such fusible disconnect devices are superior in many ways to other known fusible disconnect assemblies, they still have yet to completely meet the needs of the marketplace and improvements are desired.

For example, in the event of a fault condition the fuse(s) of the fusible disconnect device will open to protect the circuit and, once the fault condition is cleared, the fuse(s) will need to be replaced. As will be appreciated, when working with electrical components safety is of utmost importance. Therefore, it is desirable to ensure the fuse(s) can be replaced in a safe manner. While conventional fusible disconnect devices may employ an interlock that requires a single specific state of the device in order to remove and replace the fuse(s), there is room for improvement on how the interlocks operate.

Further, contacts of a conventional fusible disconnect device may tend to open under a fault condition. Such opening can damage the contacts due to arcing and, since the fuse already provides a disconnect function, opening of the contacts may not be necessary during a fault condition.

SUMMARY OF THE INVENTION

A fusible disconnect device in accordance with the present invention includes one or more of a fuse for protecting against fault conditions (e.g., excessive current), switchable contacts having a parallel contact configuration that tend to stay closed during high current conditions, an overload device that protects against heating due to high (but not excessive) current, and an interlock device that enables or inhibits operation of certain features of the fusible disconnect device depending on a state of a switching portion and a state of a fuse portion of the fusible disconnect device.

The components of the device in accordance with the invention allow for a fusible circuit breaker that does not necessarily include an instantaneous element, thereby allowing coordination. A resettable overload element provides a resettable disconnect function, keeping the user from replacing fuses for most faults. This device may be modified further to allow for use in DC systems, which are growing in use.

Further, a disconnect device in accordance with the invention may be modular. For example, the disconnect device may be formed from two or more modules that are selectively couplable to each other, where each module performs a specific function. A first module may have switching function, wherein the module includes switchable contacts and a switch operatively coupled to the switchable contacts to selectively open and close the contacts. A second module may have an overcurrent protection function, where current can be limited by use of a replaceable fuse. A third module may have an overload function, a fourth module may have a reporting function (e.g., provide an operating status of each module), and a fifth module may have a communication function (e.g., provide communication with a remote device in order to report operating conditions, status of the device, etc.). By coupling two or more modules together, a disconnect device having specific features may be obtained. Any module may have more than one function embedded in it.

The modular disconnect device also may include an interlock. In this regard, an actuator may be included on one module, and an interlock may be included on the other module. As the two or more modules are coupled together to form a disconnect device, the interlock and the actuator cooperate with each other to provide an interlock function. For example, if a switching module and a fuse module are coupled together, the actuator and the interlock operate to inhibit removal of the fuse when the switch is in the ON position, and to inhibit placing the switch in the ON position when a fuse is not secured in the fuse module.

According to one aspect of the invention, a fusible disconnect switch comprises: a switch housing; a first fuse contact member and a second fuse contact member coupled to the switch housing, each of the first fuse contact member and the second fuse contact member configured to engage and complete an electrical connection through an overcurrent protection fuse; a switch contact including a first conductor having a first contact pair electrically in series with each other and a second conductor having a second contact pair electrically in series with each other, the second conductor arranged generally parallel to the first conductor, wherein at least one of the first conductor or the second conductor is moveable relative to the other of the first conductor or the second conductor to selectively couple the first contact pair with the second contact pair to form a parallel current path through the first conductor and the second conductor, and wherein at least one of the first conductor or the second conductor is electrically connected to one of the first fuse contact member or the second fuse contact member; a switch movable between an OFF position and an ON position, wherein movement of the switch to the OFF position moves at least one of the first conductor or the second conductor to electrically disconnect the first contact pair from the second contact pair, and wherein movement of the switch to the ON position n moves at least one of the first conductor or the second conductor to electrically connect the first contact pair to the second contact pair; and an interlock operatively coupled to the first fuse contact member and the switch, the interlock configured to inhibit movement of the switch from the OFF positon to the ON position when the first fuse contact member is unsecured to the switch housing, and inhibit movement of the first fuse contact member relative to the switch housing when the switch is in the ON position.

In one embodiment, the switch further includes an overload device electrically connected to one of the first conductor or the second conductor, the overload device operative to automatically move the switch from the ON position to the OFF position based on a level of current passing through the overload device over a time period.

In one embodiment, the interlock is configured to enable movement of the switch from the OFF positon to the ON position when the first fuse contact member is secured to the switch housing.

In one embodiment, the interlock is configured to enable movement of the first fuse contact member relative to the switch housing when the switch is in the OFF position.

In one embodiment, the first fuse contact member is removably mounted to the switch housing and selectively positionable with respect to the overcurrent protection fuse.

In one embodiment, the interlock comprises: a slide joint including a connector portion coupled to the switch and a lock portion having a first lock, the lock portion spaced apart from the connector portion, wherein operation of the switch causes the slide joint to move and selectively engage or disengage the first lock with the first fuse contact member to selectively inhibit or enable removal of the first fuse contact member relative to the housing; and a second lock operative to selectively engage or disengage with the first lock to selectively inhibit or enable slide joint movement, wherein the selective engagement of the second lock with the first lock is based on a location of the first fuse contact member relative to the switch housing.

In one embodiment, the first lock comprises a slot and the second lock comprises a rejection pin and a latch, the rejection pin configured to cooperate with the first fuse contact member to selectively move the latch into and out of cooperative engagement with the slot.

In one embodiment, the first lock comprises an interlock pin and the first fuse contact member comprises a keyway configured to receive the interlock pin, and wherein when the first lock is engaged with the fuse contact member the interlock pin engages the keyway to inhibit movement of the first fuse contact member relative to the switch housing.

In one embodiment, the second lock comprises a biasing element that biases the second lock into engagement with at least one of the first fuse contact member or the slide joint.

In one embodiment, the switch includes an elastic element arranged between the connector portion and the lock portion to enable relative movement between the connector portion and the lock portion.

In one embodiment, the first lock moves along a first plane and the second lock moves along a second plane, the second plane generally orthogonal to the first plane.

In one embodiment, the first lock engages the first fuse contact member through at least 50 degrees of rotation of the rocker switch.

In one embodiment, the first fuse contact member comprises a fuse cap.

In one embodiment, the first fuse contact member is rotatably mounted to the switch housing.

In one embodiment, the switch comprises a rocker switch.

In one embodiment, rotation of the rocker switch produces linear motion of the slide joint.

In one embodiment, the when current flows through the parallel current path an attraction force is generated that tends to pull the first and second conductors toward each other.

According to another aspect of the invention, a modular disconnect switch includes: a first module comprising a first housing, a first interconnect terminal disposed in the first housing, the first interconnect terminal accessible from an exterior of the first housing, one of a line-side terminal or a load-side terminal disposed in the first housing, and at least one switchable contact disposed in the first housing, the at least one switchable contact electrically connected between the first interconnect terminal and the one of the line-side terminal or the load-side terminal, the at least one switchable contact selectively positionable in an open position and a closed position to respectively disconnect or connect an electrical connection between the first interconnect terminal and the one of the line-side terminal or the load-side terminal. The modular disconnect further includes a second module comprising a second housing different from the first housing, a second interconnect terminal disposed in the second housing, the second interconnect terminal accessible from an exterior of the second housing, the other of the line-side terminal or the load-side terminal disposed in the second housing, at least one electrical component disposed in the second housing, the at least one electrical component electrically connected between the second interconnect terminal and the other of the line-side terminal or the load-side terminal, the at least one electrical component operative to provide at least one of a status of the modular disconnect switch or electrical protection of the modular disconnect switch. The first housing and the second housing are complimentary and selectively engagable with each other to complete an electrical connection between the line-side terminal and the load-side terminal through the at least one switchable contact, the first interconnect terminal, the second interconnect terminal and the at least one electrical component.

In one embodiment, the modular disconnect switch includes a switch movable between an OFF position and an ON position, wherein movement of the switch to the OFF position moves the at least one switchable contact to electrically disconnect the first interconnect terminal from the one of the line-side terminal or the load-side terminal, and wherein movement of the switch to the ON position moves the at least one switchable contact to electrically connect the first interconnect terminal to the one of the line-side terminal or the load-side terminal.

In one embodiment, the switch is attached to the first housing.

In one embodiment, the switch comprises a rocker switch.

In one embodiment, the switch includes an overload element disposed in the first housing and electrically in series with the at least one switchable contact and electrically between the first interconnect terminal and the one of the line-side terminal and the load-side terminal.

In one embodiment, the first module comprises an actuator coupled to the switch; and the second module comprising a receptacle for receiving a fuse or a fuse carrier and an interlock positioned relative to the receptacle, wherein when the first module and second module are engaged with each other the actuator engages the interlock such that movement of any one of the switch or the actuator produces corresponding movement of the interlock and the other of the switch or actuator.

In one embodiment, the second module comprises at least one of a fuse or a fuse carrier removably insertable into the receptacle, the interlock comprises a latch and a catch, wherein when the fuse or fuse carrier is unsecured from the receptacle the latch engages the catch to positionally lock the interlock and inhibit movement of the switch to the ON position.

In one embodiment, the second module comprises at least one of a fuse or a fuse carrier removably insertable into the receptacle, and the interlock comprises a latch and a catch, wherein when the fuse or fuse carrier is secured in the receptacle the latch disengages the catch to positionally unlock the interlocks and enable movement of the switch to the ON position.

In one embodiment, the second module comprising at least one of a fuse or a fuse carrier removably insertable into the receptacle; and the interlock part comprising a pin, wherein when the switch is in the ON position the interlock positions the pin within at least a portion of the receptacle to inhibit the fuse or fuse carrier from being unsecured with respect to the receptacle.

In one embodiment, the second module comprises at least one of a fuse or a fuse carrier removably insertable into the receptacle; and the interlock comprises a pin, wherein when the switch is in the ON position the interlock positions the pin within the fuse or fuse carrier to inhibit the fuse or fuse carrier from being unsecured with respect to the receptacle.

In one embodiment, the second module comprises a fuse carrier selectively securable within the receptacle based on an angular orientation of the fuse carrier relative to the receptacle.

In one embodiment, the fuse carrier comprises a slot configured to cooperate with the pin, and when the fuse carrier is secured in the receptacle and the switch is in the ON position the pin engages the slot to inhibit rotation of the fuse carrier relative to the receptacle.

In one embodiment, the slot comprises a J-slot.

In one embodiment, the fuse carrier comprises a tab configured to cooperate with the latch, wherein when the fuse carrier is secured in the receptacle the tab engages the latch to an unlocked position and enables movement of the switch to the ON position.

In one embodiment, the at least one switchable contact comprises a first conductor having a first contact pair electrically in series with each other and a second conductor having a second contact pair electrically in series with each other, the second conductor arranged generally parallel to the first conductor, wherein at least one of the first conductor or the second conductor is moveable relative to the other of the first conductor or the second conductor to selectively couple the first contact pair with the second contact pair to form a parallel current path through the first conductor and the second conductor, and wherein at least one of the first conductor or the second conductor is electrically connected to the first interconnect terminal.

In one embodiment, the second module comprises a first fuse contact member and a second fuse contact member, each of the first fuse contact member and the second fuse contact member configured to engage and complete an electrical connection through an overcurrent protection fuse, the first fuse contact member and the second fused contact member electrically between the second interconnect terminal and the other of the line-side terminal or the load-side terminal.

According to another aspect of the invention, a switch module of a modular disconnect switch assembly includes: a housing; an interconnect terminal disposed in the housing; one of a line-side terminal or a load-side terminal disposed in the housing; at least one switchable contact disposed in the housing, the at least one switchable contact electrically connected between the interconnect terminal and the one of the line-side terminal or the load-side terminal, the at least one switchable contact selectively positionable in an open position and a closed position to respectively disconnect or connect an electrical connection between the interconnect terminal and the one of the line-side terminal or the load-side terminal; a switch operatively coupled to the at least one switchable contact, the switch movable between an OFF position and an ON position, wherein movement of the switch to the OFF position moves the at least one switchable contact to electrically disconnect the first interconnect terminal from the one of the line-side terminal or the load-side terminal, and wherein movement of the switch to the ON position moves the at least one switchable contact to electrically connect the first interconnect terminal to the one of the line-side terminal or the load-side terminal; and an actuator coupled to the switch and extending at least partially outside the housing, the actuator configured to cooperate with an interlock of another module to selectively enable or disable operation of the switch, wherein the housing is configured to be complimentary engagable with a housing of the another module to complete an electrical connection through the one of the line-side terminal or the load-side terminal, the at least one switchable contact, and the interconnect terminal to selectively provide electrical power to a load.

According to another aspect of the invention, a protection module of a modular disconnect switch assembly includes: a housing; an interconnect terminal disposed in the housing; one of a line-side terminal or a load-side terminal disposed in the housing; a receptacle including first and second terminals disposed in the housing for receiving a circuit protection element, the first terminal connected to the interconnect terminal and the second terminal connected to the one of the line-side terminal or the load-side terminal; and an interlock operatively coupled to the receptacle and extending at least partially outside the housing, the interlock part configured to cooperate with an actuator of another module switch to selectively enable or inhibit access to the receptacle, wherein the housing is configured to be complimentary engagable with a housing of the another module to complete an electrical connection through the one of the line-side terminal or the load-side terminal, the circuit protection element, and the interconnect terminal to provide protected electrical power into the another module.

According to another aspect of the invention, a modular disconnect switch, includes: a first module comprising a first housing, a first interconnect terminal disposed in the first housing, the first interconnect terminal accessible from an exterior of the first housing, one of a line-side terminal or a load-side terminal disposed in the first housing, and at least one circuit protection or control device disposed in the first housing, the at least one circuit protection or control device electrically connected between the first interconnect terminal and the one of the line-side terminal or the load-side terminal, the at least one circuit protection or control device operable to selectively connect or disconnect an electrical connection between the first interconnect terminal and the one of the line-side terminal or the load-side terminal. The modular disconnect switch further includes a second module comprising a second housing different from the first housing, a second interconnect terminal disposed in the second housing, the second interconnect terminal accessible from an exterior of the second housing, the other of the line-side terminal or the load-side terminal disposed in the second housing, at least one electrical component disposed in the second housing, the at least one electrical component electrically connected between the second interconnect terminal and the other of the line-side terminal or the load-side terminal, the at least one electrical component operative to provide at least one of a status of the modular disconnect switch or electrical protection of the modular disconnect switch. The first housing and the second housing are complimentary and selectively engagable with each other to complete an electrical connection between the line-side terminal and the load-side terminal through the at least one circuit protection or control device, the first interconnect terminal, the second interconnect terminal and the at least one electrical component.

According to another aspect of the invention, a switch module of a modular disconnect switch assembly that includes: a module comprising a housing, an interconnect terminal disposed in the housing, the interconnect terminal accessible from an exterior of the housing, one of a line-side terminal or a load-side terminal disposed in the housing, and at least one circuit protection or control device disposed in the housing, the at least one circuit protection or control device electrically connected between the interconnect terminal and the one of the line-side terminal or the load-side terminal, the at least one circuit protection or control device selectively operable to selectively connect or disconnect an electrical connection between the interconnect terminal and the one of the line-side terminal or the load-side terminal, wherein the housing is configured to be complimentary engagable with a housing of another module to complete an electrical connection through the one of the line-side terminal or the load-side terminal, the at least one circuit protection or control device, and the interconnect terminal to selectively provide electrical power to a load.

In one embodiment, the at least one circuit protection or control device comprises a switch movable between an OFF position and an ON position and at least one switchable contact selectively positionable in an open position and a closed position to respectively disconnect or connect an electrical connection between the first interconnect terminal and the one of the line-side terminal or the load-side terminal, wherein movement of the switch to the OFF position moves the at least one switchable contact to electrically disconnect the first interconnect terminal from the one of the line-side terminal or the load-side terminal, and wherein movement of the switch to the ON position moves the at least one switchable contact to electrically connect the first interconnect terminal to the one of the line-side terminal or the load-side terminal.

In one embodiment, the first module comprises an actuator coupled to the switch; and the at least one electrical component comprises a receptacle for receiving a fuse or a fuse carrier and an interlock positioned relative to the receptacle, wherein when the first module and second module are engaged with each other the actuator engages the interlock such that movement of any one of the switch or the actuator produces corresponding movement of the interlock and the other of the switch or the actuator.

In one embodiment, the at least one electrical component comprises at least one of a fuse or a fuse carrier removably insertable into the receptacle, the interlock comprises a latch and a catch, and wherein when the fuse or fuse carrier is unsecured from the receptacle the latch engages the catch to positionally lock the interlock and inhibit movement of actuator to the ON position.

In one embodiment, the at least one electrical component comprises at least one of a fuse or a fuse carrier removably insertable into the receptacle, and the interlock comprises a latch and a catch, and wherein when the fuse or fuse carrier is secured in the receptacle the latch disengages the catch to positionally unlock the interlocks and enable movement of the switch to the ON position.

In one embodiment, the at least one electrical component comprises at least one of a fuse or a fuse carrier removably insertable into the receptacle; and the interlock part comprises a pin, and wherein when the switch is in the ON position the interlock positions the pin within at least a portion of the receptacle to inhibit the fuse or fuse carrier from being unsecured with respect to the receptacle.

In one embodiment, the at least one electrical component comprises at least one of a fuse or a fuse carrier removably insertable into the receptacle; and the interlock comprises a pin, and wherein when the switch is in the ON position the interlock positions the pin within the fuse or fuse carrier to inhibit the fuse or fuse carrier from being unsecured with respect to the receptacle.

In one embodiment, the at least one electrical component comprises a fuse carrier selectively securable within the receptacle based on an angular orientation of the fuse carrier relative to the receptacle.

In one embodiment, the fuse carrier comprises a slot configured to cooperate with the pin, and when the fuse carrier is secured in the receptacle and the switch is in the ON position the pin engages the slot to inhibit rotation of the fuse carrier relative to the receptacle.

In one embodiment, the slot comprises a J-slot.

In one embodiment, the fuse carrier comprises a tab configured to cooperate with the latch, wherein when the fuse carrier is secured in the receptacle the tab engages the latch to an unlocked position and enables movement of the switch to the ON position.

In one embodiment, the at least one switchable contact comprises a first conductor having a first contact pair electrically in series with each other and a second conductor having a second contact pair electrically in series with each other, the second conductor arranged generally parallel to the first conductor, wherein at least one of the first conductor or the second conductor is moveable relative to the other of the first conductor or the second conductor to selectively couple the first contact pair with the second contact pair to form a parallel current path through the first conductor and the second conductor, and wherein at least one of the first conductor or the second conductor is electrically connected to the first interconnect terminal.

In one embodiment, the at least one electrical component comprises a first fuse contact member and a second fuse contact member, each of the first fuse contact member and the second fuse contact member configured to engage and complete an electrical connection through an overcurrent protection fuse, the first fuse contact member and the second fused contact member electrically between the second interconnect terminal and the other of the line-side terminal or the load-side terminal.

In one embodiment, the at least one electrical component comprises at least one of a fuse holder or a fuse.

In one embodiment, the at least one circuit protection or control device comprises a switch, at least one switchable contact, an overload element, or a microcontroller.

An advantage of the present invention is that safety of the fusible disconnect device is enhanced, as access to the fuse elements as well as placing the fusible disconnect device in the "ON" state is enabled only when the fusible switching device is in a safe state. Another advantage is that the switch contacts tend to stay closed during a high current fault condition, thereby preventing damage of the contact surfaces due to arcing.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention may take physical form in certain parts and arrangement of parts, an embodiment of which is described in detail in the specification and illustrated in the accompanying drawings, wherein:

FIG. 8A shows a side-view of two modules coupled together with an outer cover removed to reveal the inner region of the disconnect device, FIG. 8B showing a close-up view of the interlock mechanism, FIG. 8C showing the modules decoupled from one another and FIG. 8D showing the modules coupled to one another;

DETAILED DESCRIPTION OF THE INVENTION

Figure 1:
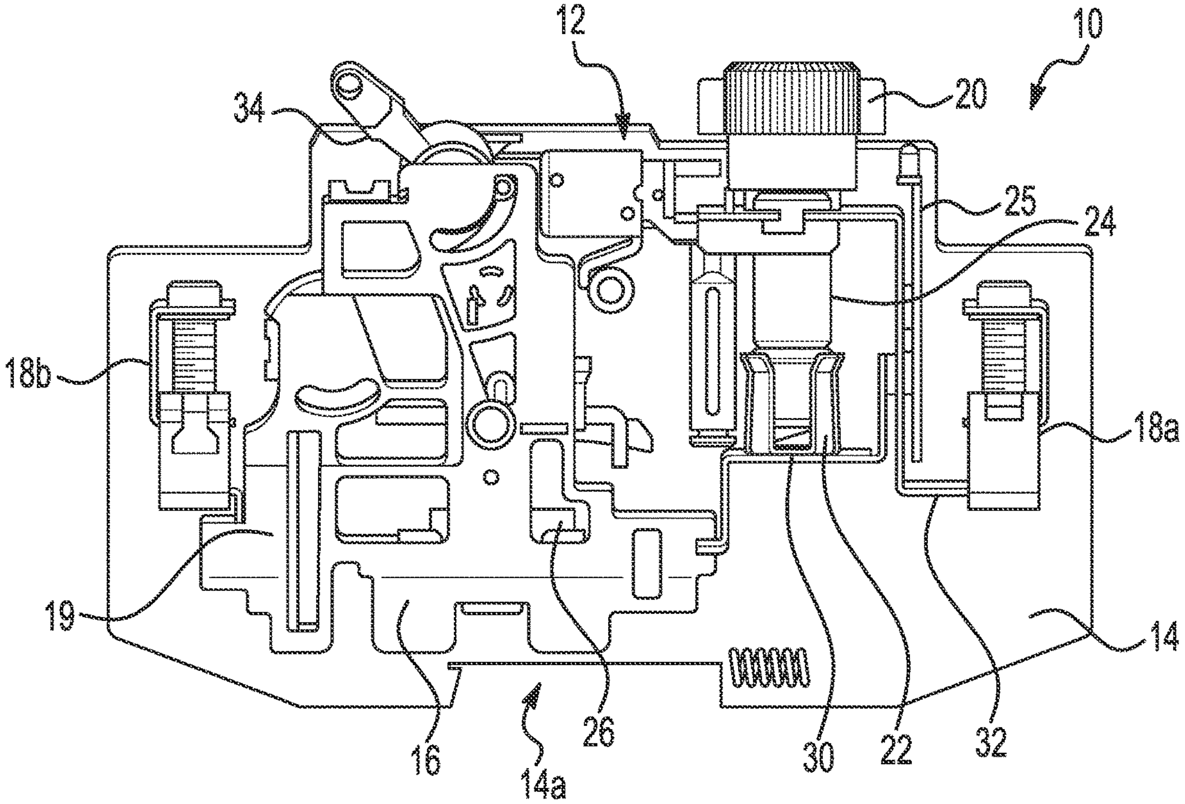
FIG. 1 is a side view of an exemplary fusible disconnect device that includes an interlock in accordance with the present invention.

Embodiments of the present invention will now be described with reference to the drawings, wherein like reference numerals are used to refer to like elements throughout. It will be understood that the figures are not necessarily to scale.

Figure 2:
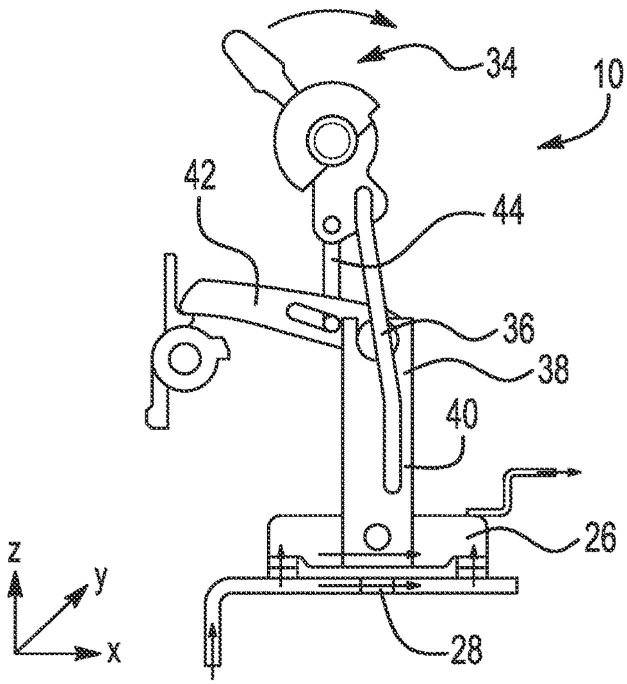
FIG. 2 is partial side view of the fusible disconnect device of FIG. 1, illustrating the switch, contacts and overload and associated linkage of the fusible disconnect device.

Referring to FIGS. 1 and 2, illustrated is a side view and a partial side view, respectively, of an exemplary fusible disconnect device 10 incorporating an interlock device, a switch contact, a fuse and an overload in accordance with the invention. The fusible disconnect device 10 includes a switch housing 14 having a frame 16 to which components of the fusible disconnect device are attached. Preferably, the switch housing 14 and frame 16 are formed from non-conductive materials (e.g., plastic or the like). The switch housing 14 may include a spring-biased slot 14*a* for connection to a support member, such as a rail or the like (not shown). Line and load terminals 18*a*, 18*b* provide a connection between a power source and a device to be protected (not shown). In the exemplary embodiment the terminals 18*a*, 18*b* are screw terminals, although other types of terminals may be utilized. An overload element 19, such as a bimetallic overload element, electronic overload element, or the like, is electrically connected between the line and load terminals 18*a*, 18*b* and provides protection from thermal overload conditions, as is conventional.

The fusible disconnect device also includes a first fuse contact member 20 and a second fuse contact member 22 coupled to the switch housing 10, each of the first fuse contact member 20 and the second fuse contact member 22 configured to engage and complete an electrical connection through an overcurrent protection fuse 24. The first fuse contact member 22 is removably mounted to the switch housing 14 and selectively positionable with respect to the overcurrent protection fuse 24 and housing. For example, the first fuse contact member 20 may be embodied as a fuse cap that is rotatably mounted to the switch housing 14. Rotation in one direction (e.g. clockwise) secures tabs of the fuse cap to a receiver portion in the housing, and rotation in the opposite direction (e.g., counterclockwise) unlatches and/or disconnects the tabs from the receiver portion and enables removal of the fuse cap from the housing. An indicator 25 provides a visual indication of the state of the fuse 24 based on, for example, a voltage differential across the first and second fuse contact members 20, 22.

To provide selective switching, the fusible disconnect device 10 also includes a switch contact assembly having, for example, a movable switch contact 26 and a fixed switch contact 28 coupled to the switch housing 14, the movable switch contact 26 movable between an opened position (in which the load terminal 18*b* is electrically disconnected from the line terminal 18*a*) and a closed position (in which the load terminal 18*b* is electrically connected to the line terminal 18*a* through the fuse 24). In the exemplary embodiment of FIG. 1, one of the movable switch contact 26 and the fixed switch contact 28 is electrically in series with the first and second fuse contact members 20, 22 and the line terminal 18*a* via busing 30, 32, while the other of the movable switch contact 26 and the fixed switch contact 28 is electrically in series with the overload element 19 and load terminal 18*b*. When the movable switch contact 26 is in the closed position, an electrical connection is completed between the line terminal 18_a_ and the load terminal 18_b_ through the overload 19, switch contacts 26, 28, and fuse 24.

The fusible disconnect device 10 of FIGS. 1 and 2 also includes a switch 34 that is operative to selectively position the movable switch contact 26 relative to the fixed switch contact 28 to produce one of the opened and closed positions. In the illustrated embodiment, the switch 34 is a rocker switch that rotates about an axis. Other types of switch mechanisms, however, may be utilized in place of a rocker switch.

As illustrated in FIG. 2, the switch 34 is operatively coupled to the movable switch contact 26 via first linkage 36 and actuator assembly 38 to enable a user to manually place the movable switch contact 26 in one of the opened or closed positions. A slot 40 formed in the actuator assembly 38 permits some rotational movement of the switch 34 prior to movement of the movable switch contact 26. The switch 34 is also operatively coupled to a tripping unit 42 through second linkage 44, and the tripping unit 42 is operatively coupled to the overload element 19. In the event of an overload condition, the overload element 19 will automatically trip the switch 34 via the tripping unit 42 and thus cause the movable contact 26 to move into the "OFF" (opened) position, thereby interrupting the circuit between the line terminal 18_a_ and the load terminal 18_b_. While FIG. 2 illustrates a specific linkage configuration, it will be appreciated that other configurations are possible.

Figure 3:
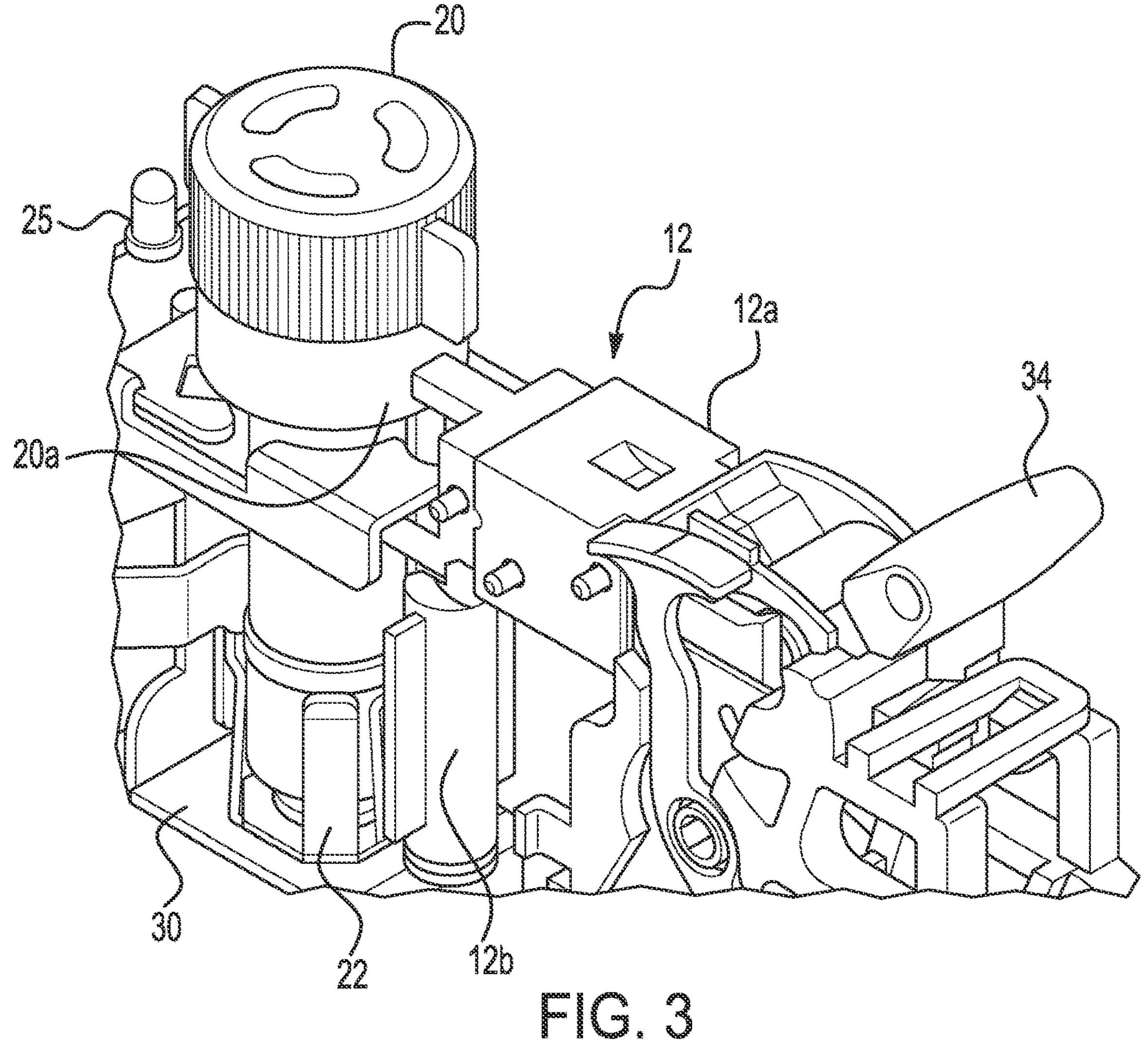
FIG. 3 is partial perspective view of the fusible disconnect device of FIG. 1, illustrating the switch, fuse contacts and interlock in accordance with the invention.

With additional reference to FIG. 3, illustrated is a perspective view of a portion of the fusible disconnect device 10 showing the interlock 12 in more detail. The interlock 12 is formed from a first interlock part 12_a_ and a second interlock part 12_b_. As will be discussed in further detail below with respect to FIGS. 5A, 5B, 6A and 6B, the first interlock part 12_a_ is operatively coupled to the switch 34 and selectively interfaces with a keyway 20_a_ of the first fuse contact member 20 to enable or inhibit removal of the first fuse contact member. The keyway 20_a_ may be formed as a notch, bore, slot, or any other device that can inhibit removal of the first fuse contact member from the housing. Additionally, the second interlock part 12_b_ selectively interfaces with the first fuse contact member 20 and the first interlock part 12_a_ to enable or inhibit operation of the switch from the OFF positon to the ON position if the first fuse contact member 20 is unsecured or otherwise removed from the switch housing 14. In one embodiment, at least a portion of the first interlock 12_a_ moves along a first plane (e.g., a horizontal plane) and at least a portion of the second interlock 12_b_ moves along a second plane (e.g., a vertical plane), the second plane generally orthogonal to the first plane.

Figure 4:
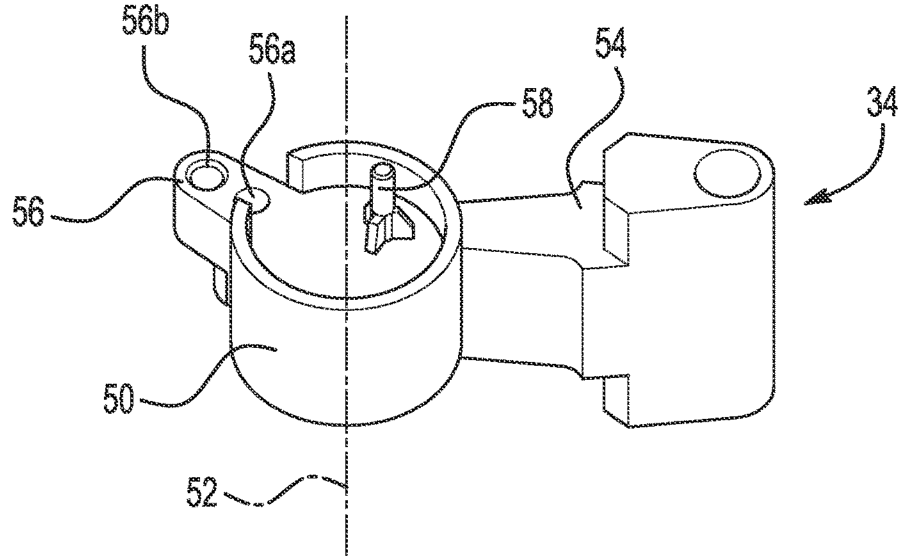
FIG. 4 is a perspective view of an exemplary rocker switch that may be used with the fusible disconnect device in accordance with the invention.

Referring briefly to FIG. 4, illustrated is an exemplary switch 34 that may be used to operate the movable switch contacts 26 of the fusible disconnect device 10. The exemplary switch 34 of FIG. 4 is shown as a rocker switch, and includes a base 50 that is rotatable about an axis 52. Extending out from the base 50 is a user-operable handle 54 that may be used to cause rotation of the base 50 about the axis 52. Additionally, a first connector portion 56 extends out from the base 50, the first connector portion 56 including a first through-hole 56_a_ and a second through-hole 56_b_. The first through-hole 56_a_ is coupled to the second linkage 36 (see FIG. 2) to operate the movable switch contact 26 between the opened (OFF) and closed (ON) positions, while the second through-hole 56_b_ is coupled to the tripping unit 42 to automatically open the movable contact 26 in the event of an overload condition. Extending axially out from the base 50 is a second connector portion 58, which as discussed in further detail below with respect to FIGS. 5A and 5B interfaces with the first interlock part 12_a_. In the illustrated embodiment, the second connector portion 58 is in the form of a pin, although other configurations may be employed.

Figure 5A:
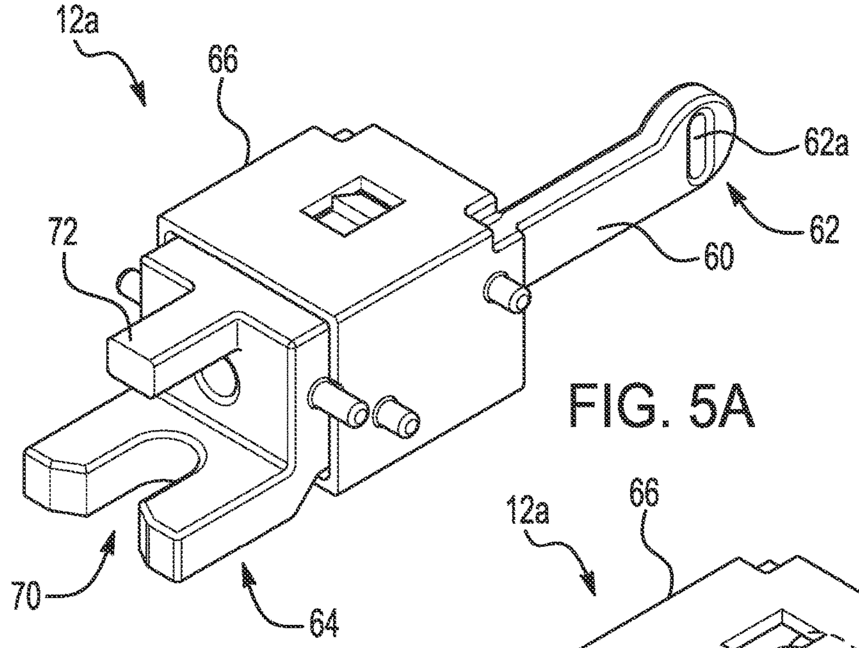
FIGS. 5A and 5B are perspective views of an exemplary first interlock part in accordance with the present invention.
Figure 5B:
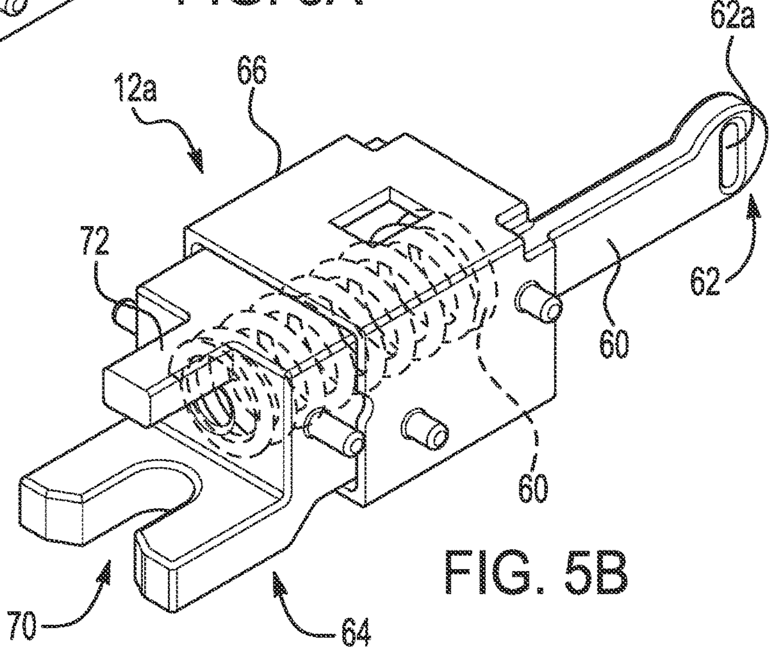

Moving now to FIGS. 5A and 5B, illustrated is a perspective view of a first interlock part 12_a_ in accordance with an embodiment of the invention. The first interlock part 12_a_ includes a slide joint 60 having a connector portion 62 arranged at a distal end of the slide joint 60. The connector portion 62 includes a bore or slot 62_a_ that interfaces with the second connector portion 58 of the switch 34, where rotational movement of the switch 34 produces linear movement of the slide joint 60.

The first interlock part 12_a_ further includes a lock portion 64 spaced apart from the connector portion 62. The lock portion 64 and the slide joint 60 (and thus the connector portion 62) are joined together within a guide 66, such that movement of the connector portion 62 produces movement of the lock portion 64. In one embodiment, the connection between the slide joint 60 and the lock portion 64 is a direct (fixed) connection such that movement of the slide joint 60 produces corresponding movement of the lock portion 64. In another embodiment, an elastic element 68, such as a spring or the like, is arranged between the slide joint 60 and the lock portion 64. The elastic element 68 enables some relative movement between the connector portion 62 and the lock portion 64. By enabling the position of the lock portion 64 to vary relative to the connector portion 62, the elastic element 68 enables the first lock portion 64 to engage the first fuse contact member 20 through a large angle of rotation (e.g., at least 50 degrees) of the rocker switch 34.

The lock portion 64 includes a first lock 70 and, in the illustrated embodiment, the first lock 70 is in the form of a generally U-shape slot having a leading open end. A width of the leading "open" end of the "U-shape" slot is less than a width of the back "closed" portion of the "U-shape" slot. As will be described in further detail below, this difference in width enables a second locking device to latch with the first lock 70 and provide a positive engagement that inhibits movement of the slide joint 60 and connector portion 62 (and thus the switch 34, which is operatively connected to the connector portion 62).

The lock portion 64 also includes an interlock pin 72 that interfaces with the keyway 20_a_ of the first fuse contact member 20 (see FIG. 3). The keyway 20_a_ is configured to receive the interlock pin 72 and, when the two are engaged, inhibit movement of the first fuse contact member 20 relative to the switch housing 14 (e.g., inhibit rotation of the first fuse contact member 20 relative to the housing 14 or otherwise prevent removal of the first fuse contact member 20 from the housing 14).

Figure 6A:
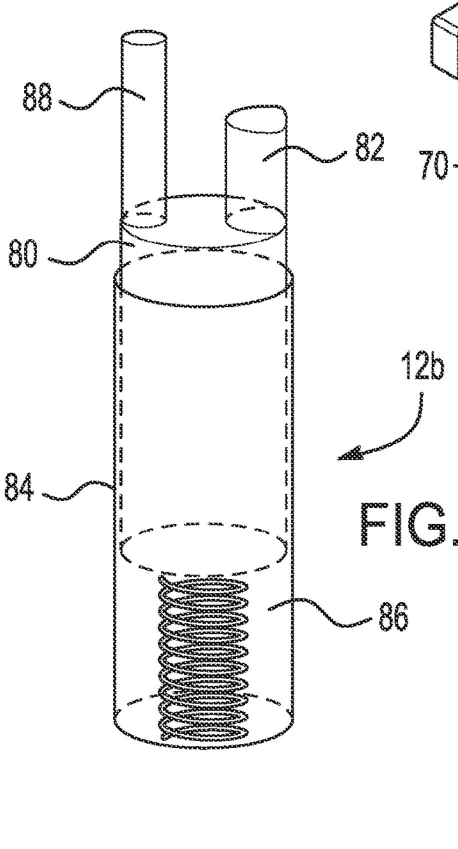
FIG. 6A is a perspective view of an exemplary second interlock part in accordance with the present invention.
Figure 6B:
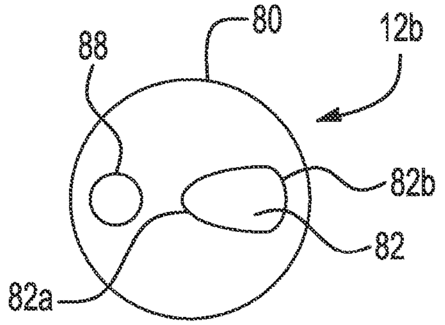
FIG. 6B is a top view of the second interlock part of FIG. 6A.

Moving to FIGS. 6A and 6B, illustrated is the second interlock part 12_b_, which includes a second lock 80 operative to selectively engage/disengage a latch 82 of the second lock 80 with the first lock 70, thereby selectively inhibiting/enabling slide joint movement. In this regard, the second lock 80 is movably arranged within a support 84, and a biasing element 86, such as a spring, provides a biasing force on the second lock 80. The second lock 80 further includes a rejection pin 88 configured to cooperate with the first fuse contact member 20 to selectively move the latch 82 into and out of cooperative engagement with the first lock 70. Selective engagement of the latch 82 with the first lock 70 is based on a location of the first fuse contact member 20 relative to the switch housing 14. As can be seen in FIG. 6B, a width of a front portion 82_a_ of the latch 82 is thinner than a width of a back portion 82*b* of the latch. This difference in width enables the latch 82 to positively engage the first lock 70 and prevent lateral (left/right) movement of the first lock 70.

When the first fuse contact member 20 is secured to the housing 14, the rejection pin 88 of the second lock 80 is pushed downward thereby also moving the latch 82 downward out of engagement with the first lock 70 and also compressing the biasing element 86. Thus, the switch 34 may be moved between the ON and OFF positions. When the first fuse contact member 20 is unsecured from the housing 14, the rejection pin 88 of the second lock 80, due to the force created by biasing element 86, moves upward causing the latch 82 to engage with the first lock 70 and prevent lateral movement of the slide joint 60. Thus, the switch 34 may not be moved from the OFF position to the ON position.

Operation of the switch 34 causes the slide joint 60 to move and selectively engage/disengage the interlock pin 72 of the first lock 64 with the keyway 20*a* of the first fuse contact member 20. When the switch 34 is in the OFF position, the interlock pin 72 is withdrawn from the keyway 20*a* and movement of the first fuse contact member 20 relative to the housing 14 is permitted. When the switch 34 is in the ON position, the interlock pin 72 engages the keyway 20*a* and movement of the first fuse contact member 20 relative to the housing 14 is inhibited.

Accordingly, the interlock device 12 permits removal of the first fuse contact member 20 from the housing 14 (and thus removal/replacement of the fuse) when the switch 34 is in the "OFF" position, and prevents removal of the first fuse contact member 20 from the housing 14 (and thus prevents removal/replacement of the fuse) when the switch 34 is in the "ON" position. Further, the interlock device 12 in accordance with the invention permits movement of the switch 34 between the "ON" and "OFF" position when the first fuse contact member 20 is secured to the housing 14, and prevents movement of the switch 34 to the "ON" position when the first fuse contact member 20 is removed or otherwise unsecured from the housing 14.

Figure 7A:
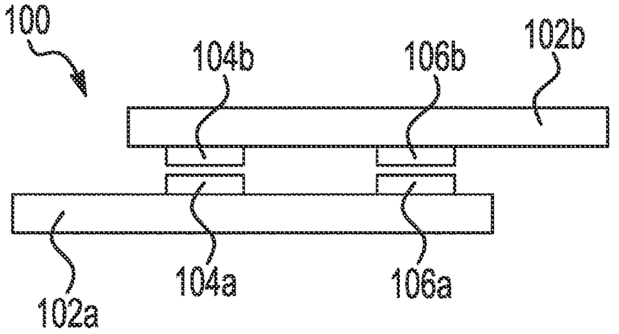
FIGS. 7A and 7B illustrate an exemplary parallel contact configuration that may be utilized in the fusible disconnect device in accordance with the invention.
Figure 7B:
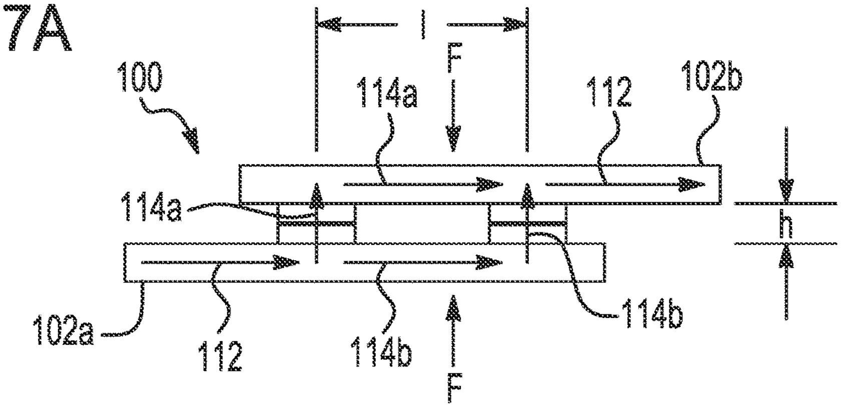

Moving now to FIGS. 7A and 7B, illustrated is a switch contact arrangement 100 that can be used as the switch contact of the fusible disconnect device 10. The switch contact arrangement 100 is a double contact parallel configuration that includes a first (lower) conductor 102*a* having a first contact pair 104*a*, 106*a* electrically in series with each other and a second (upper) conductor 102*b* having a second contact pair 104*b*, 106*b* electrically in series with each other. The second conductor 102*b* is arranged generally parallel to the first conductor 102*a*, and one or both of the first conductor 102*a* or the second conductor 102*b* is moveable toward to the other. Relative movement between the first and second conductors 102*a*, 102*b* selectively couples the first contact pair 104*a*, 106*a* with the second contact pair 104*b*, 106*b* (contact elements 104*a* and 104*b* contact each other, and contact elements 106*a* and 106*b* contact each other) to form a parallel current path 114*a*, 114*b* through the first and second conductors 102*a*, 102*b* via the first contact pair 104*a*, 106*a* and second contact pair 104*b*, 106*b*.

For example, and with reference to FIG. 7B, input current 112*a* flows into the first conductor 102*a* and a portion 114*a* of the current 112 travels through the contacts 104*a*, 104*b* and into to the second conductor 102*b*. A remaining portion 114*b* of the current 112, which, assuming similar contact resistance, is approximately equal to the portion 114*a*, travels through the conductor 102*a* and through the contacts 106*a*, 106*b*. The portions 114*a* and 114*b* rejoin at the end of the second conductor 102*b* to form output current 112*b*, which is equal to input current 112*a*.

The parallel flow of current 114*a* and 114*b* between the first and second conductors 102*a*, 102*b* generates an attraction force F that tends to pull the upper and lower conductors 102*a*, 102*b* toward each other, thereby maintaining the "closed" condition (particularly under fault conditions that produce high current). This attraction force is proportional to the distance "1" between contact pairs 194, 106 and the separation distance "h" between conductors 102*a*, 102*b*. Thus, the double contact parallel configuration 100 tends to keep the contacts 104*a*, 104*b* and 106*a*, 106*b* closed when high current is flowing through the conductors 102*a*, 103*b* (due to the magnetic attraction force generated by the current that tends to pull the first and second conductors toward each other). Such condition exists when there is a high current fault, during which the fuse is expected to operate and not the switch contact.

By utilizing the parallel contact configuration, the drive force of a spring that pushes the contacts together is aligned with the magnetic forces applied to the first and second conductors 102*a*, 102*b* due to the current passing through them. This helps to keep the contact pairs 104*a*, 106*a*, 104*b*, 106*b* closed, and limits arcing damage during high current events.

Further, the fault and interrupting duty on the contacts is increased due to the fact that they may be opened during faults. The parallel contact design minimizes the spring force required to keep the contacts closed, and allow for proper operation of the device on overload, limiting arc damage, allowing the user to open it with reasonable force, and keeping the device compact.

Moving now to FIGS. 8A-8D, illustrated are partial cutaway views of a disconnect device 200 in accordance with another embodiment of the invention. The disconnect device of FIGS. 8A-8D is a modular device for use with DIN rail mounting system, where two or more modules can be connected together to form a disconnect device having specific features. In this regard, the housings of the respective modules can be shaped complimentary to each other such that when coupled to one another form a complete disconnect device. An electrical connection between the first and second modules 202, 204 is established by way of interconnect terminals 210, 212, which electrically connect to one another when the first and second modules are coupled together. In the embodiment illustrated in FIGS. 8A-8D, the disconnect device 200 is formed from a first module 202, such as a switch module that provides a switching function, and a second module 204, such as a fuse module that provides an overcurrent protection function, coupled to the first module 202. While a switch module and a fuse module are illustrated, it should be appreciated that other types of modules may be employed. Other modules can include, for example, a communication module that enables the modular disconnect device to communicate with a remote controller or monitoring system, a status module that monitors a status of the switch, the fuse, the communications, etc.

Figure 8A:
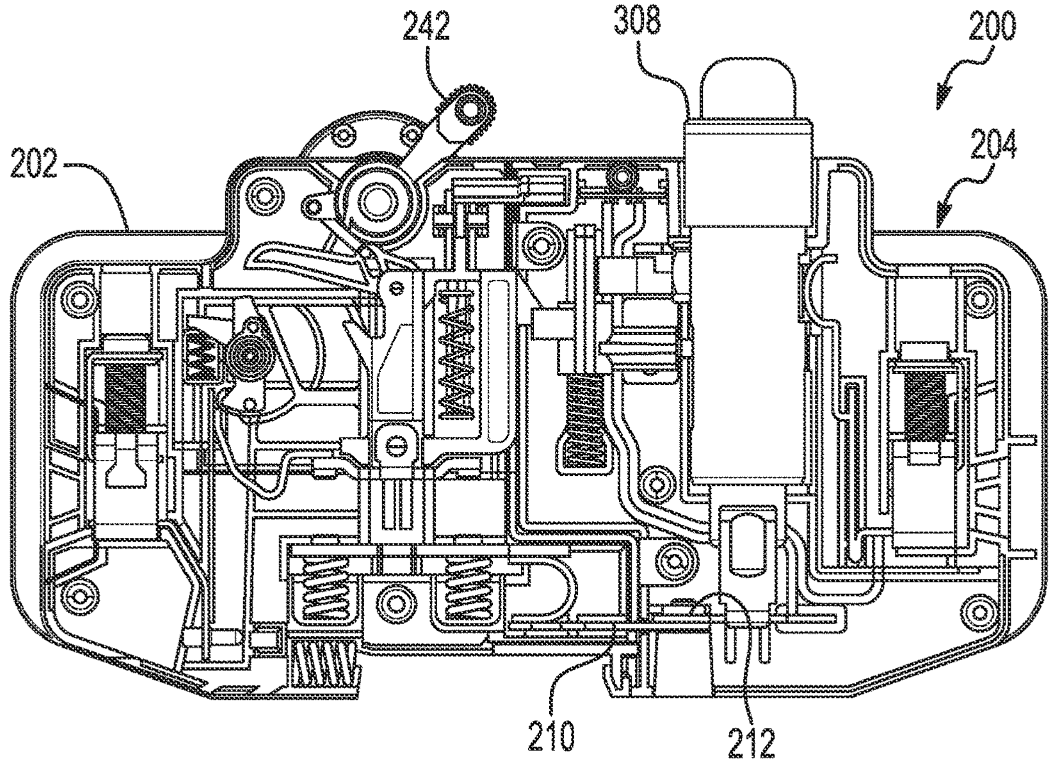
FIGS. 8A-8D are side and perspective views of an exemplary modular disconnect device in accordance with another embodiment of the invention.
Figure 8B:
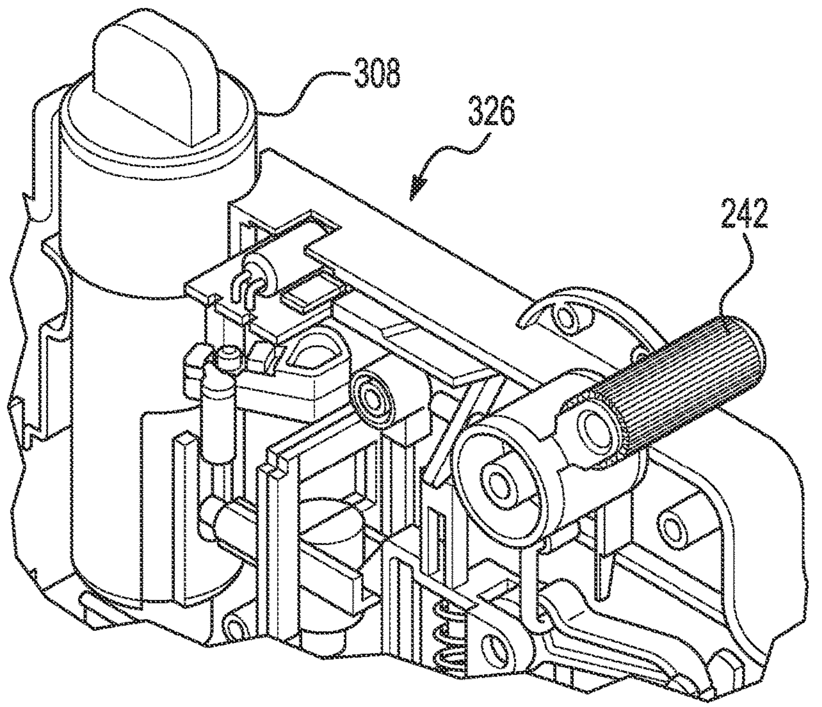
Figure 8C:
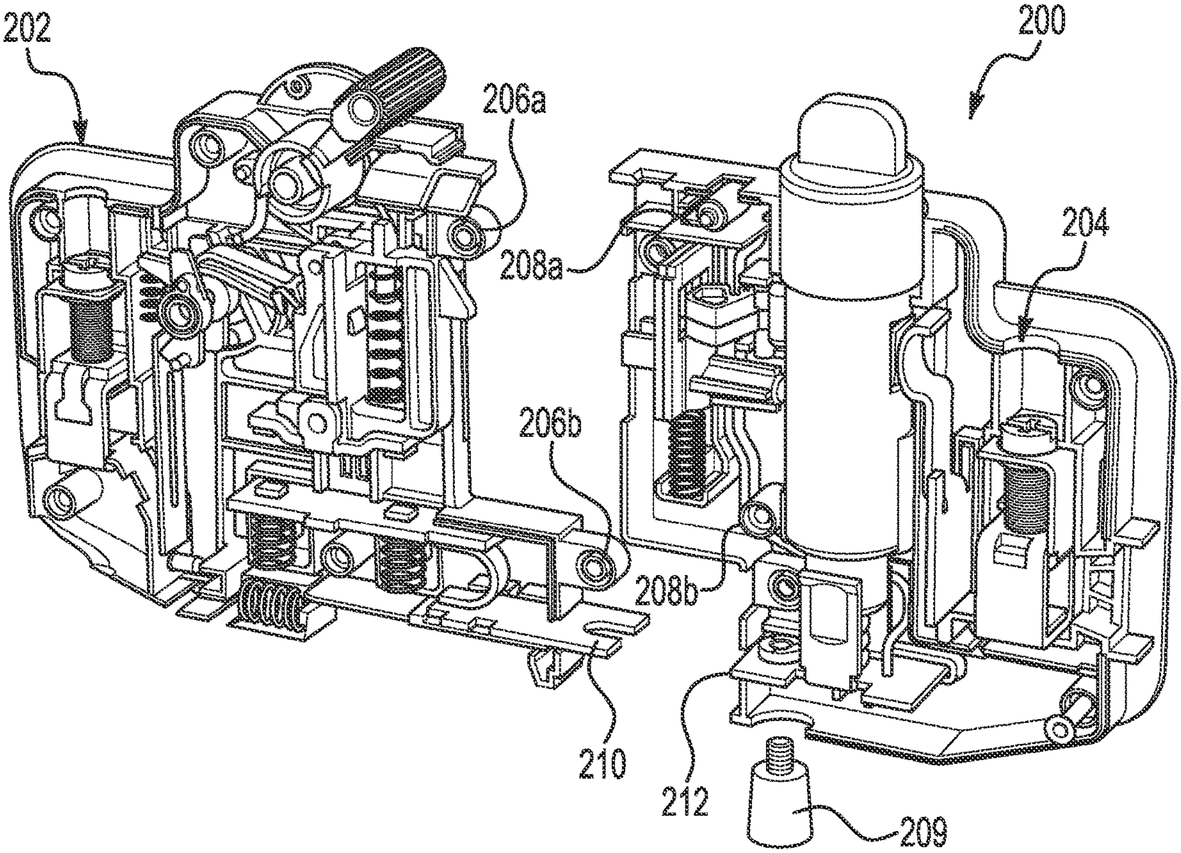
Figure 8D:
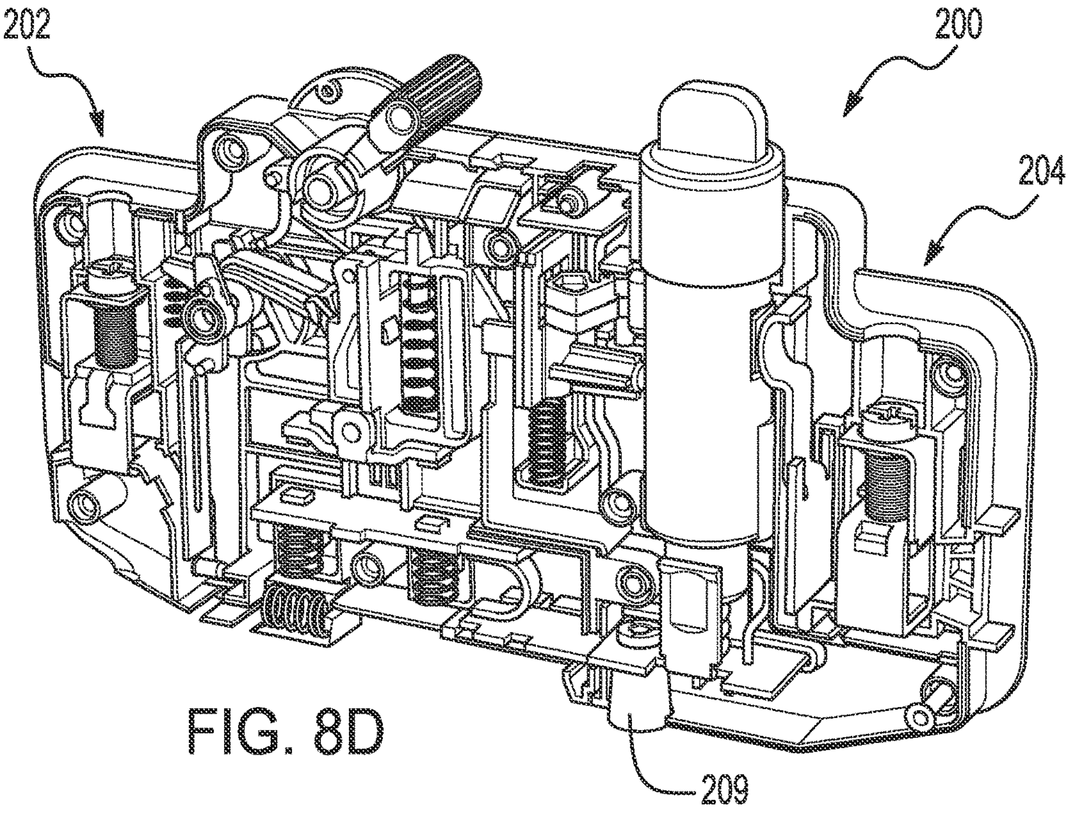

The modules 202, 204 can be selectively coupled/decoupled from each other. In this regard, a first securing device of the first module 202, such as engaging tabs 206*a*, 206*b* cooperate with second securing device of the second module 204, such as receiving tabs 208*a*, 208*b*, to securely hold the modules 202, 204 together as best seen in FIG. 8C (e.g., the engaging tab clips over the receiving tab), yet permit disassembly if desired. A lock member 209, such as a threaded fastener or the like, secures the first module 202 to the second module 204 to prevent inadvertent separation of the two modules. Other types of securing means may be employed. For example, one module may include a threaded bore or through hole and the other module may include a corresponding through hole. A fastener, such as a screw, rivet, etc. then may be placed in the bore/through holes to secure the second module 204 to the first module 202. If desired, decoupling of the modules from one another may be limited to authorized personnel by requiring a custom tool or other means of preventing undesired decoupling of the modules.

Figure 9A:
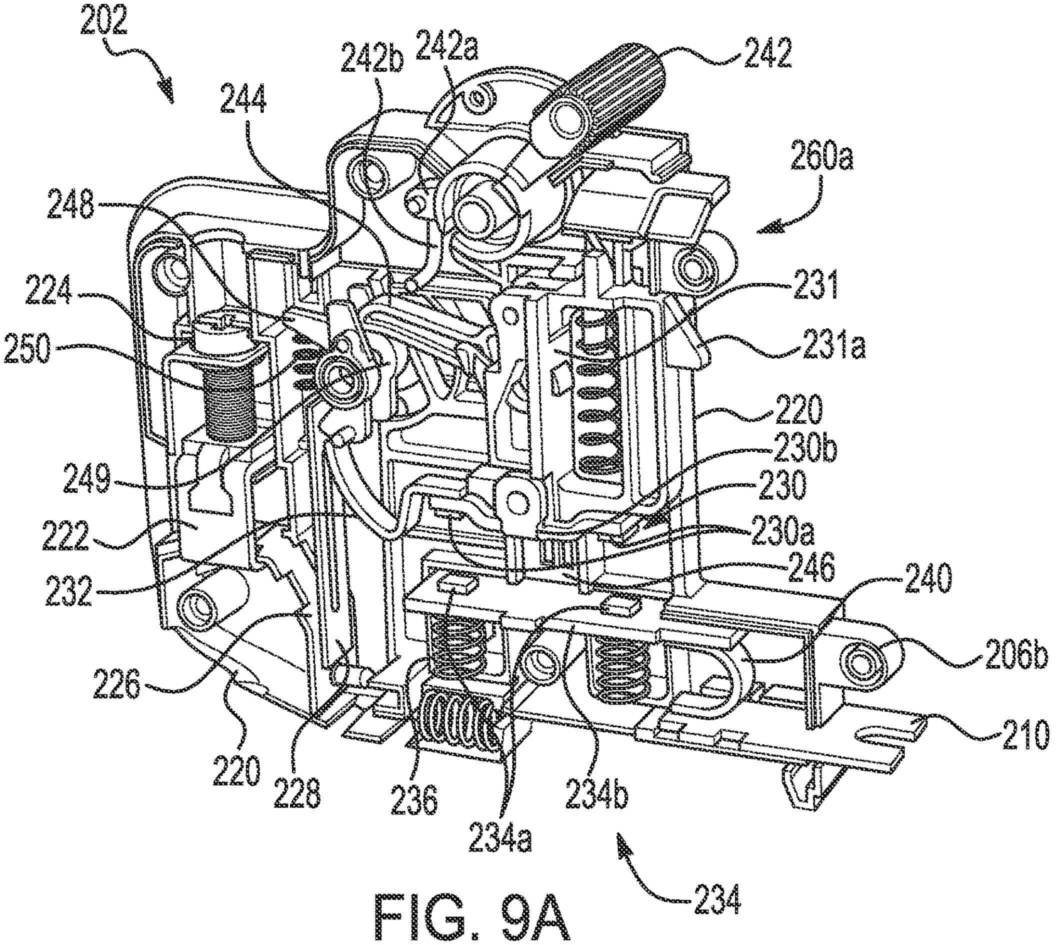
FIG. 9A is a detailed view of the switch module of FIGS. 8A-8D.
Figure 9B:
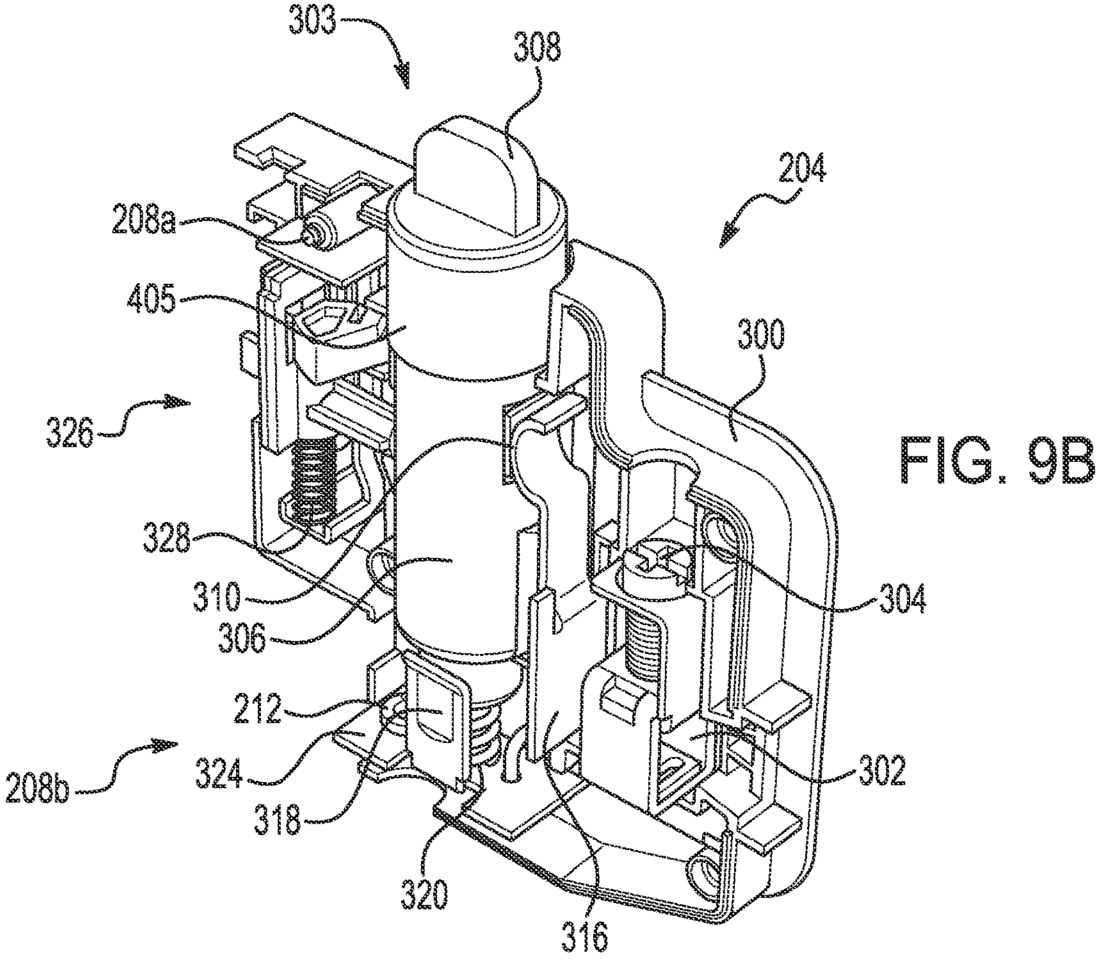
FIG. 9B is a detailed view of the fuse module of FIGS. 8A-8D.

With additional reference to FIGS. 9A-9B, the exemplary first and second modules 202, 204 are shown individually. FIG. 9A illustrates a switch module while FIG. 9B illustrates a fuse module. The exemplary switch module 202 of FIG. 9A includes a housing 220 that provides a support structure to which other components of the first module may be mounted, and for connecting to other modules, e.g., for connecting to the second module 204. The housing 220 preferably is formed from non-conductive materials, such as plastic, resin or the like. Formed on one side of the housing 220 are the aforementioned engagement tabs 206*a*, 206*b*. On an opposite side of the housing 220 is a terminal 222 (e.g., a load-side terminal) for electrically connecting to a load. The load-side terminal 222 may be any conventional terminal, such as a clamp style terminal or the like, wherein a conductor may be inserted into the terminal 222 and secured by a clamping force generated by a screw 224. Bus bar 226 connects terminal 222 to one terminal of an optional overload device 228, which performs a conventional overload function. The other terminal of the overload device 228 is connected to movable contacts 230 via flexible conductor 232 such that the overload device 228 is electrically in series with the movable contacts 230.

As will be discussed in more detail below, movable contacts 230 move in a linear up/down direction to selectively couple/decouple from semi-fixed contacts 234 (the movable contacts move between an open position and a closed position). In this regard, movable contacts 230 are mounted to a sliding bar 231 that moves in a linear up/down direction, the sliding bar having an actuator 231*a* for implementing an interlock function as discussed in more detail below.

The semi-fixed contacts 234 are supported by one or more bias members 236, such as one or more springs. As the movable contacts 230 move into the closed position, they contact the semi-fixed contacts 234 and apply a force thereto. The bias members 236 slightly compress to allow limited movement of the semi-fixed contacts 234. In this manner, a constant force is maintained on the contacts 230, 234 when in the closed position, thereby ensuring good electrical connection between the contacts.

As discussed herein, the contacts 230, 234 may have a parallel configuration, where the movable contacts 230 are formed from two contacts 230*a* arranged on a first conductor 230*b* (which is attached to the sliding bar 231) to form a series electrical connection between the two contacts 230*a*, and the semi-fixed contacts 234 are formed from two contacts 234*a* arranged on a second conductor 234*b* to form a series electrical connection between the two contacts 234*a*. When the movable contacts 230 are in the closed position, a parallel circuit path is formed between the two semi-fixed contacts 234*a* and the two movable contacts 230*a*, and as current passes through the parallel contact configuration a force is generated that tends to keep the contacts together.

The conductor 234*b* of the semi-fixed is electrically connected to an interconnect terminal 210 of the first module 202 via flexible conductor 240, at least a portion of the interconnect terminal 210 accessible from an exterior of the first housing 220. As will be discussed below, the interconnect terminal 210 provides a means for electrically connecting one module to another module to provide an electrical connection to the load terminal 222 through the contacts 230, 234.

Figure 10:
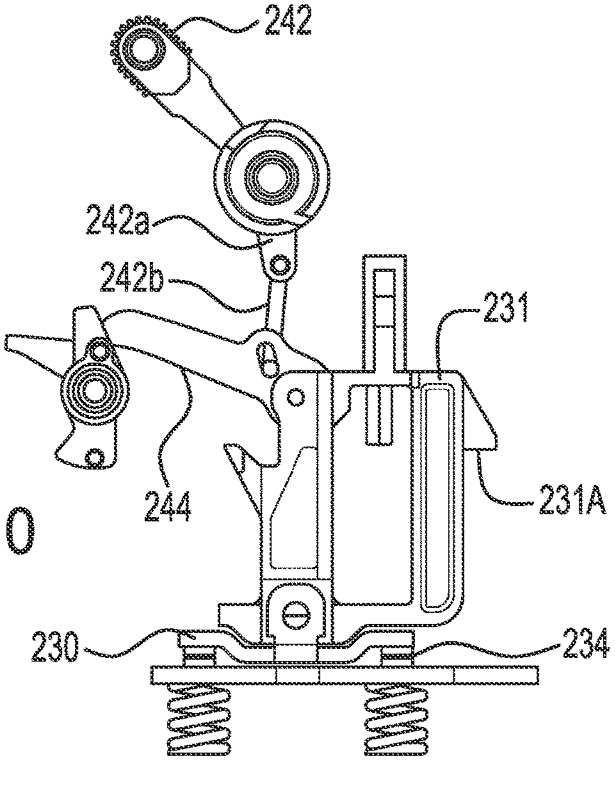
FIG. 10 is partial side view of the fusible disconnect device of FIG. 8A-8D, illustrating the switch, contacts and associated linkage of the fusible disconnect device.

With continued reference to FIG. 9A and additional reference to FIG. 10, to effect movement of the movable contacts 230 between the open and closed positions, a user operable switch 242, such as a rocker switch, is mounted to the housing 220, a portion of the switch extending outside the housing to enable user access. An arm 242*a* of the switch 242 is coupled to an actuator arm 244 via linkage 242*b* such that rotation of the switch 242 causes the actuator arm 244 to move. The actuator arm 244 is coupled to sliding bar 231 to cause the sliding bar 231 to move linearly in channel 246 formed within the housing 220. The sliding bar 231 includes an actuator 231*a* that provides an interlock function, and in the illustrated embodiment the actuator 231*a* is formed as a protrusion having a sloped leading surface, and a flat bottom section. As discussed in further detail below the actuator 231*a* cooperates with an interlock 326 (FIGS. 12A and 12B— discussed below) to inhibit or enable certain operations based on the position of the switch 242 and whether the fuse holder is secured within the housing.

Movement of the switch 242 to the OFF position separates the movable contact 230 from the semi-fixed contact 234 and electrically disconnects the interconnect terminal 210 from the load-side terminal 222. Conversely, movement of the switch 242 to the ON position moves the movable contact 230 against the semi-fixed contact 234 to electrically connect the interconnect terminal 210 to the load-side terminal 222 through the overload device 228.

Also connected to the actuator arm is a trip arm 248 of the overload device 228. In the event of an overload condition, the bi-metal element of the overload 228 deflects thereby causing the trip arm 248 to pivot. As the trip arm 248 pivots, and when the switch 242 is in the ON position, the actuator arm 244 is released from catch 249 thereby causing the switch 242 to move to the OFF position. As the switch 242 moves to the OFF position, the sliding bar 231 moves upward, thereby separating the movable contacts 230 from the semi-fixed contacts 234 to disconnect the electrical connection between the load-side terminal 222 and the interconnect terminal 210. Upon the overload condition being cleared, bias member 250 moves the trip arm 248 back to the normal position.

Moving to FIG. 9B, an exemplary second module 204 is illustrated in partial cutaway. The second module 204 includes a housing 300 that provides a support structure to which other components of the second module may be mounted, and for connecting to other modules, e.g., the first module 202. The second housing 300 is separate and distinct from the first housing 220 of the first module 200. Like the housing of the first module 202, the housing 300 preferably is formed from non-conductive materials, such as plastics, resins, or the like. Formed on one side of the housing 300 are the receiving tabs 208*a*, 208*b*, and on an opposite side of the housing 220 is a terminal 302 (e.g., a line-side terminal) for connecting to electrical power. The line-side terminal 302 preferably is the same type of terminal utilized on the first module 202, e.g., a clamp-style terminal or the like secured by a clamping force generated by a screw 304.

Figure 13A:
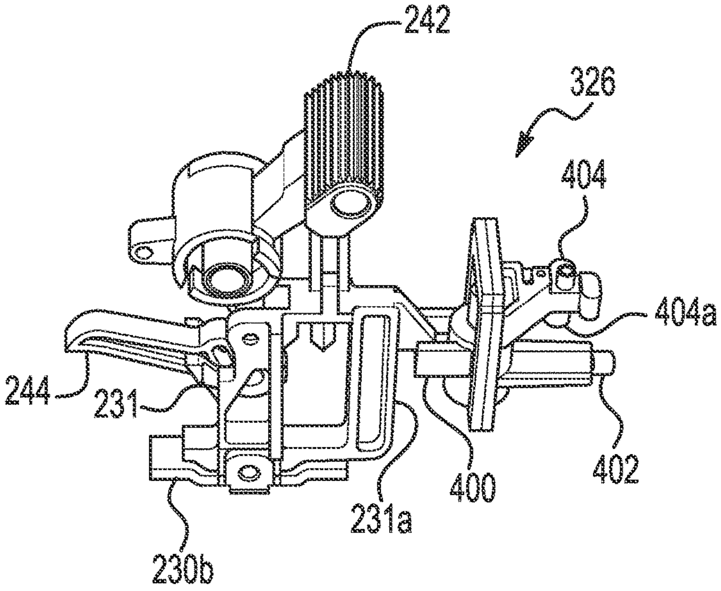
FIGS. 13A and 13B illustrate an exemplary interlock device for use in the modular disconnect device in accordance with the invention.
Figure 13B:
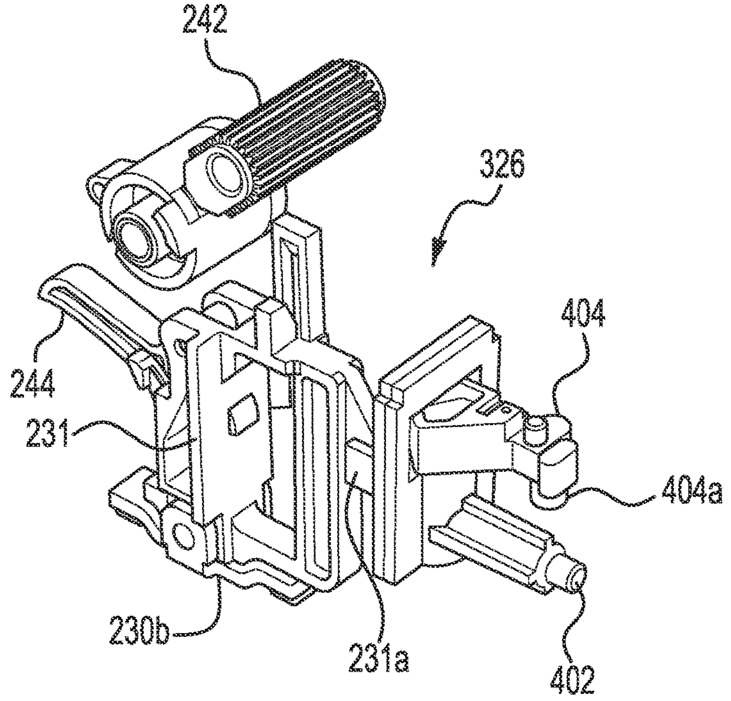

The second module 204 includes a receptacle 303 for an electrical component, such as fuse carrier 306 for various types of fuses (e.g., UL, IEC, CCC certified fuse carriers, fuse modules for the specific purpose of a fused circuit breaker or fused disconnect switch), which can be removably inserted into the receptacle 303, the fuse carrier 306 including a fuse cap 308 and a fuse access contact 310 arranged along an outer surface of the fuse carrier 306 (best seen in FIG. 13B, discussed below). A fuse may be placed in the carrier 306 by inserting the fuse through a bottom portion of the fuse carrier 306.

The fuse access contact 310 extends to an inner portion of the fuse carrier 306 and contacts a ferrule of a fuse within the carrier, thus enabling the first ferrule of the fuse to be accessed from outside the carrier. Extending from a bottom portion of the fuse carrier 306 is the other (second) fuse ferrule. While the embodiment of FIG. 9B illustrates a fuse carrier disposed in the housing 300, other types of devices may be used to form different types of modules. For example, an electronic overload, a status monitor for monitoring current and voltage, etc. may be used to create application-specific modules.

Bus bar 316 connects terminal 302 to the first fuse ferrule through the first fuse access contact 310. The second fuse ferrule connects to receiving terminal 318 in the housing 300, and bias spring 320 arranged in the receiving terminal 318 tends to bias the receiving terminal 318 upward to maintain proper alignment of the fuse carrier with the interlock as discussed in further detail below. Although not shown in FIG. 9B, an optional fuse status indicator can be electrically connected between the fuse ferrules to provide a status of the fuse.

Bus bar 324 connects the receiving terminal 318 to an interconnect terminal 212 of the second module 204, the interconnect terminal 212 disposed in the second housing 300 and accessible from an exterior of the second housing. The interconnect terminal 212 cooperates with the interconnect terminal 210 of the first housing 202 to electrically couple the line-side terminal 302 to the load-side terminal 222 through the fuse contained in the fuse carrier 306, the contacts 230, 234 and the overload 228. The interconnect terminals 210, 212 can be any terminals that cooperate with each other to provide a good electrical connection. In the illustrated embodiment one terminal comprises a U-shape fuse-clip contact and while the other comprises a cylindrical contact that can be pressed/snapped into the fuse clip contact.

The second module 204 also includes an interlock 326 that cooperates with the actuator 231*a* of the first module 202 to move in upward/downward directions to perform an interlock function, the interlock 326 biased in the upward direction by bias spring 328. As will be discussed in more detail below, the interlock 326 selectively moves up/down to enable/inhibit access to and/or removal of the fuse carrier 306, and to enable/inhibit operation of the switch 242 of the first module 202.

Figure 11A:
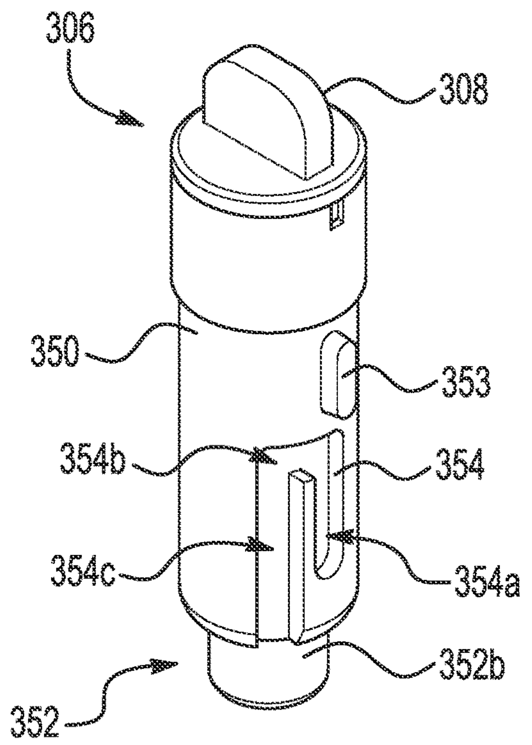
FIGS. 11A-11C illustrate an exemplary fuse carrier for use in the fuse module in accordance with the invention.
Figure 11B:
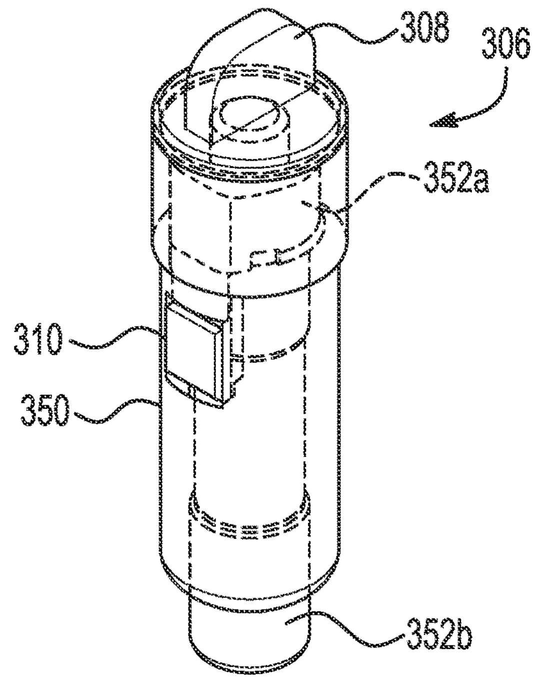
Figure 11C:
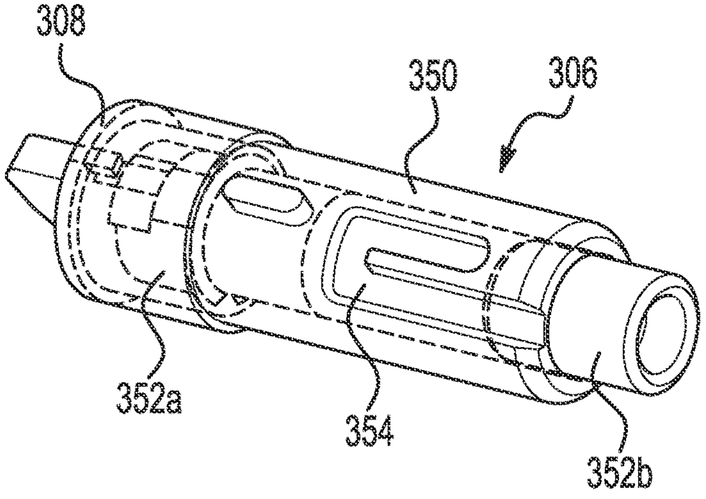

Moving to FIGS. 11A-11C, illustrated is an exemplary fuse carrier 306 in accordance with the invention. The fuse carrier 306 includes a body 350 having a cavity dimensioned and shaped to receive a fuse 352, e.g., a cylindrical fuse, a square fuse, etc. The illustrated fuse carrier 306 includes a fuse access contact 310 that enables an electrical connection to a first ferrule 352*a* of the fuse 352 from outside the carrier. More specifically, a contact is formed on an outer surface of the fuse carrier 306, the contact extending into the cavity of the fuse carrier and making an electrical connection with the first fuse ferrule 352*a*. Additionally, a tab 353 protrudes from the exterior of the fuse body 350, the tab 353 operative to cooperate with a portion of the interlock 326 as discussed in more detail below.

The illustrated fuse carrier 306 includes an open distal end that permits insertion/removal of the fuse 352 from the carrier and also permits the second ferrule 352*b* of the fuse to protrude out from the fuse carrier 306. Fuse cap 308 is fixedly connected to the body 350 at the proximal end of the fuse carrier 306 and may be configured with an integral handle, or the fuse cap may be configured to receive a tool, such as a screwdriver or other like tool, to assist in installing or removing the fuse carrier 306 from the housing 300. Formed within an outer wall of the fuse carrier 306 is a retaining slot 354, which, as will be discussed below, cooperates with the interlock 326 to selectively inhibit/enable removal of the fuse carrier 306 from the second module 204. In the illustrated embodiment the retaining slot is formed having a "J" shape (i.e., a J-slot), although other shapes are possible. The slot 354 includes first and second slot portions 354*a* and 354*c* that are spaced apart from each other and generally parallel to each other, and third slot portion 354*c* that connects the first and second slot portions, the third slot portion being generally perpendicular to the first and second slot portions.

Figure 12A:
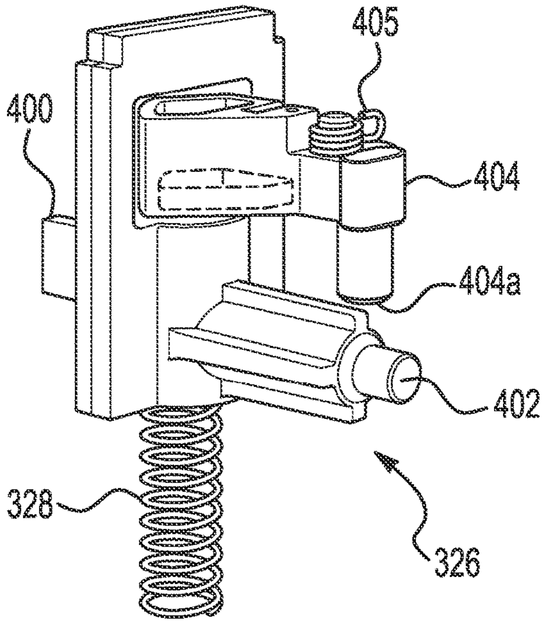
FIGS. 12A and 12B are perspective views of an exemplary interlock part in accordance with an embodiment of the present invention.
Figure 12B:
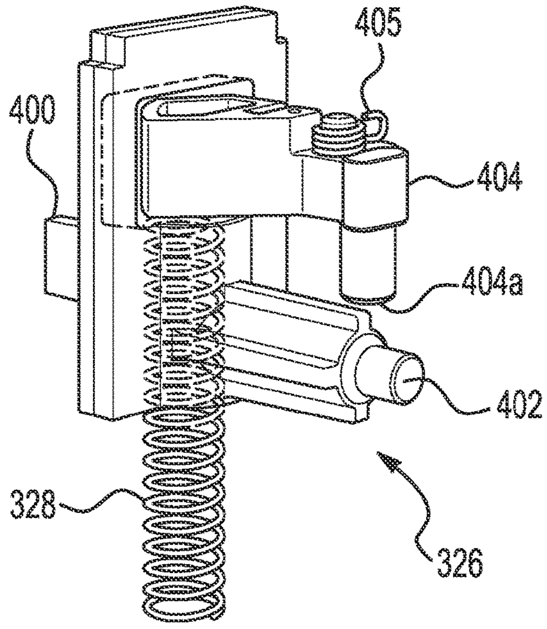

FIGS. 12A and 12B illustrate an exemplary interlock 326 that cooperates with the actuator 231*a* and the fuse carrier 306 to provide an interlock function as discussed herein, while FIGS. 13A and 13B show the actuator 231*a* and the interlock 326 cooperatively engaged with each other. The operating mechanism that includes the switch 242, sliding bar 231, the actuator 231*a* and the interlock 326 provide the basic operating mechanism for moving the movable contacts 230 between the ON and OFF positions and for enabling/inhibiting positioning the switch 242 to the ON position and removing the fuse carrier 306 from the housing 300.

The interlock 326 includes a receiver 400 for receiving the actuator 231*a*. In the illustrated embodiment, the receiver 400 is formed as a rectangular slot that corresponds to a size and shape of the actuator 231*a*. As will be appreciated, the receiver 400 may take on other shapes, e.g., circular, triangular, etc. Preferably, the shape of the receiver 400 corresponds to a shape of the actuator 231*a*. The receiver 400 is configured to enable the actuator 231*a* to be inserted into the receiver 400 as the first and second modules are coupled to one another.

The interlock 326 also includes a pin 402 that protrudes into the receptacle 303 of the housing 300. As discussed below, when the fuse carrier 306 is secured in the housing 300 the retaining slot 354 of the carrier is aligned such that the pin 402 may move in an up/down direction along a longitudinal axis of the fuse carrier 306. When the pin 402 is in the "down" position, rotation of the fuse carrier 306 relative to the housing 300 is inhibited and, thus, removal of the fuse carrier 306 from the housing 300 is inhibited.

The interlock part 326 further includes a wing latch 404 that cooperates with the fuse carrier 306 to pivot between a first position or a second position. The wing latch 404 includes a pivot pin 404*a* that is received by a corresponding bore 405 within the housing 300, and a bias member 405 that tends to bias the wing latch in one direction. More specifically, when the fuse carrier 306 is secured into the second housing 300 (e.g., the fuse carrier is inserted in the housing and rotated relative to the housing) the tab 353 of the fuse carrier 306 contacts the wing latch 404 such that the wing latch pivots away from and out of catch 406 (best seen in FIGS. 14A-14E) of the interlock 326. When the latch 404 is pivoted away from the catch 406, the actuator 231*a* and the interlock 326 are permitted to move in a linear up/down direction (and thus the switch 242 may be freely moved between the OFF and ON positions). When the fuse carrier 306 is not secured within the second housing 300, the wing latch 404 pivots to a second position and enters the catch 406, thereby preventing movement of the interlock 326 (and thus the actuator 231*a*, the sliding bar 231 and the switch 242) to the ON position. A biasing means 328, such as a spring or the like, biases the receiver 400 in the upward direction.

As can be seen in FIGS. 13A and 13B, the actuator 231*a* moves with the sliding bar 231, which in the exemplary embodiment is a linear (up/down) movement relative to the immediately adjacent outer wall 220*a* of the housing 220. Thus, as the switch 242 is moved from the OFF position to the ON position the sliding bar 231 moves linearly in a downward direction to press the movable contacts 230 against the semi-fixed contacts 234. Since the actuator 231*a* is coupled to the sliding bar 231, it also moves in the downward direction. Conversely, as the switch 242 is moved from the ON position to the OFF position, the sliding bar 231 and the actuator 231*a* move in the upward direction and the contacts 230, 234 are separated from each other.

Figure 14A:
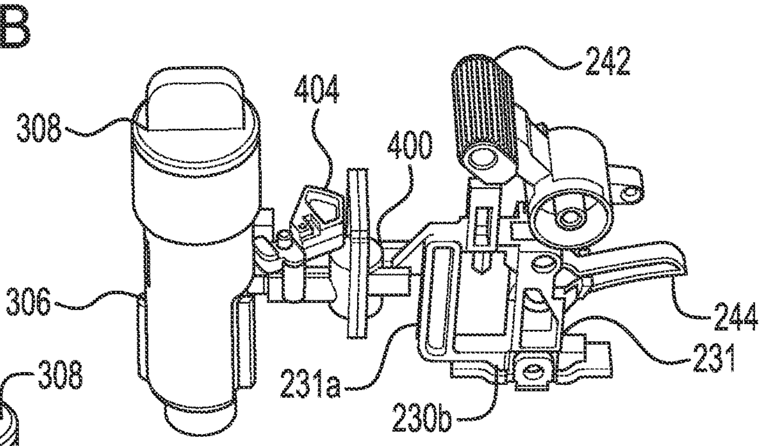
FIGS. 14A-14E illustrate various views of the exemplary interlock device and fuse carrier in accordance with the invention coupled to one another.
Figure 14B:
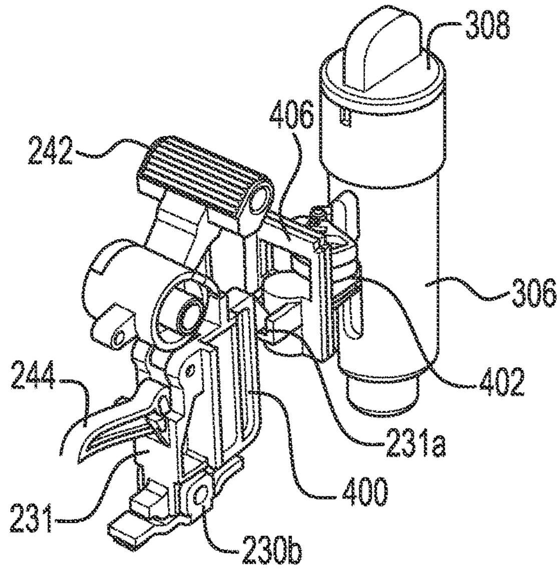
Figure 14C:
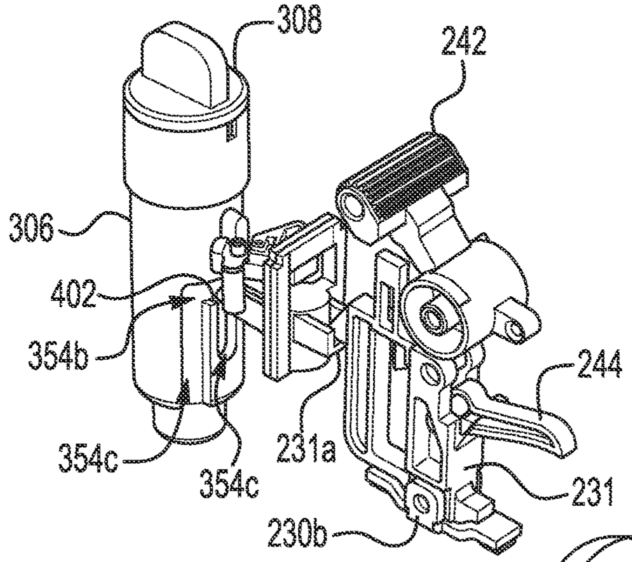
Figure 14D:
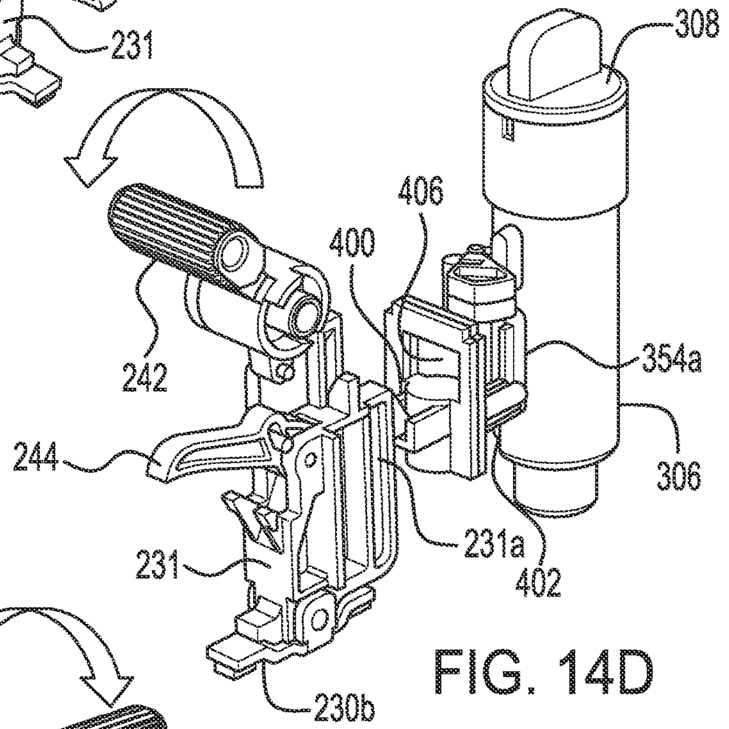
Figure 14E:
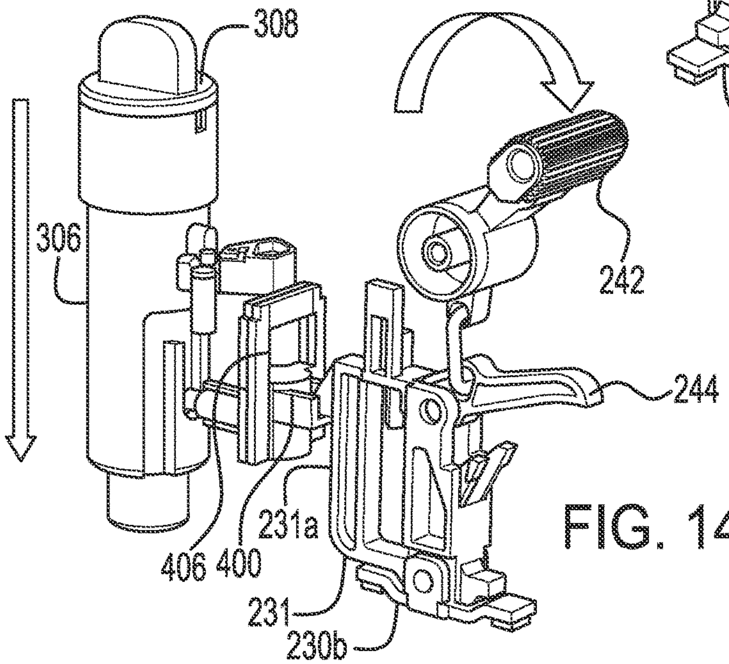

With additional reference to FIGS. 14A-14E, operation of the interlock will now be described. It is noted that in each of FIGS. 14A-14E the fuse carrier is in the secured position in the housing 300, with the wing pivot 404 pushed out from the catch 406 by the tab 353 of the fuse carrier 306. In FIGS. 14A-14C the switch 242 is in the OFF position, while in FIGS. 14D and 14E the switch 242 is in the ON position.

With the switch 242 in the OFF position (FIGS. 14A-14C), the actuator 231*a* is in the upmost position, and bias spring 328 maintains the interlock 326 in contact with the actuator 231*a* in the upmost position. Pin 402 is aligned with a right-most vertical portion 354*a* of the retaining slot 354 such that movement of the pin 402 is permitted along a longitudinal axis of the fuse carrier 306. Additionally, pin 402 is aligned with a horizontal portion 354*b* of the retaining slot 354 such that the fuse carrier 306 may be rotated relative to the housing 300. In this configuration, two mutually exclusive operations are possible, i.e., the fuse carrier 306 may be removed from the housing 300 or the switch 242 may be moved from the OFF position to the ON position.

More specifically, with the switch is in the OFF position and the fuse carrier 306 secured in the housing 300, the fuse carrier 306 may be removed from the housing 300 by rotating the carrier 306 relative to the housing 300 such that pin 402 traverses the horizontal portion 354*b* and eventually aligns with left-most vertical portion 354*c* of the retaining slot 354. The fuse carrier 306 then may be lifted out of the housing 300. Additionally, as the fuse carrier 306 is rotated the tab 353 rotates with the carrier 306 and permits the wing latch 404, which is biased toward the catch 406, to pivot into the catch 406 of the interlock 326. With the wing latch 404 in the catch 406, the interlock 326 cannot move in the downward direction. Further, since the actuator 231*a* is within the receiving slot 400, the actuator 231*a*, along with the sliding bar 231 and the switch 242, cannot be moved to the ON position.

Moving back to the configuration in which the fuse carrier 306 is secured in the housing 300 (i.e., when the right-most portion 354*a* of the retaining channel 354 is aligned with the pin 402), the wing latch 404 is moved out of the catch 406 by the tab 353, thus releasing the interlock 326. With the interlock 326 free to move, the actuator 231*a*, sliding bar 231 and switch 242 are also free to move and thus the switch 242 may be moved to the ON position.

With the switch in the ON position, the actuator 231*a* and thus the interlock 328 are in the down-most position and the pin 402 is securely within the right-most portion 354*a* of retaining slot 354. As such, rotation of the fuse carrier 306 relative to the housing 300 is inhibited by the pin 402 and therefore the fuse carrier cannot be removed from the housing. Only upon the switch 242 being moved to the OFF position (thereby moving the actuator 231*a* and interlock in the up-most position and aligning the pin 402 with the horizontal portion 354*b* of the retaining slot 354) may the fuse carrier 306 be removed from the housing.

Accordingly, a modular disconnect device in accordance with the invention provides the ability to customize the disconnect device based on the specific needs of the application. Further, safe operation of the disconnect device is ensured by way of the interlock, which prevents removal of the fuse carrier when the switch is in the ON position and also prevents moving the switch to the ON position when the fuse carrier is not secured within the housing.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A modular disconnect switch, comprising:
- a first module comprising
  - a first housing,
  - a first interconnect terminal disposed in the first housing, the first interconnect terminal accessible from an exterior of the first housing,
  - one of a line-side terminal or a load-side terminal disposed in the first housing, and
  - at least one circuit protection or control device disposed in the first housing, the at least one circuit protection or control device electrically connected between the first interconnect terminal and the one of the line-side terminal or the load-side terminal, the at least one circuit protection or control device operable to selectively connect or disconnect an electrical connection between the first interconnect terminal and the one of the line-side terminal or the load-side terminal; and
- a second module comprising
  - a second housing different from the first housing,
  - a second interconnect terminal disposed in the second housing, the second interconnect terminal accessible from an exterior of the second housing,
  - the other of the line-side terminal or the load-side terminal disposed in the second housing,
  - at least one electrical component disposed in the second housing, the at least one electrical component electrically connected between the second interconnect terminal and the other of the line-side terminal or the load-side terminal, the at least one electrical component operative to provide electrical protection of the modular disconnect switch, wherein the first housing and the second housing are complimentary and selectively engageable with each other to complete an electrical connection between the line-side terminal and the load-side terminal through the at least one circuit protection or control device, the first interconnect terminal, the second interconnect terminal and the at least one electrical component, and wherein the at least one electrical component comprises at least one of a fuse holder or a fuse.

2. The modular disconnect switch according to claim 1, wherein the at least one circuit protection or control device comprises a switch, at least one switchable contact, an overload element, or a microcontroller.

3. The modular disconnect switch according to claim 1, wherein the at least one circuit protection or control device comprises a switchable contact.

4. The modular disconnect switch according to claim 1, further comprising an overload element disposed in the first housing and electrically in series with the at least one circuit protection or control device and electrically between the first interconnect terminal and the one of the line-side terminal and the load-side terminal.

5. The modular disconnect switch according to claim 1, wherein the first module comprises an actuator coupled to the switch; and the at least one electrical component comprises a receptacle for receiving a fuse or a fuse carrier and an interlock positioned relative to the receptacle, wherein when the first module and second module are engaged with each other the actuator engages the interlock such that movement of any one of the switch or the actuator produces corresponding movement of the interlock and the other of the switch or the actuator.

6. The modular disconnect switch according to claim 5, wherein the at least one electrical component comprises at least one of a fuse or a fuse carrier removably insertable into the receptacle, the interlock comprises a latch and a catch, and wherein when the fuse or fuse carrier is unsecured from the receptacle the latch engages the catch to positionally lock the interlock and inhibit movement of the actuator to the ON position.

7. The modular disconnect switch according to claim 5, wherein the at least one electrical component comprises at least one of a fuse or a fuse carrier removably insertable into the receptacle, the interlock comprises a latch and a catch, and wherein when the fuse or fuse carrier is secured in the receptacle the latch disengages the catch to positionally unlock the interlocks and enable movement of the switch to the ON position.

8. The modular disconnect switch according to claim 5, wherein the at least one electrical component comprises at least one of a fuse or a fuse carrier removably insertable into the receptacle;

the interlock part comprises a pin, and wherein when the switch is in the ON position the interlock positions the pin within at least a portion of the receptacle to inhibit the fuse or fuse carrier from being unsecured with respect to the receptacle.

9. The modular disconnect switch according to claim 5, wherein the at least one electrical component comprises at least one of a fuse or a fuse carrier removably insertable into the receptacle;

the interlock comprises a pin, and wherein when the switch is in the ON position the interlock positions the pin within the fuse or fuse carrier to inhibit the fuse or fuse carrier from being unsecured with respect to the receptacle.

10. A modular disconnect switch, comprising:

a first module comprising:

a first housing, a first interconnect terminal disposed in the first housing, the first interconnect terminal accessible from an exterior of the first housing, one of a line-side terminal or a load-side terminal disposed in the first housing, and at least one circuit protection or control device disposed in the first housing, the at least one circuit protection or control device electrically connected between the first interconnect terminal and the one of the line-side terminal or the load-side terminal, the at least one circuit protection or control device operable to selectively connect or disconnect an electrical connection between the first interconnect terminal and the one of the line-side terminal or the load-side terminal; and a second module comprising a second housing different from the first housing, a second interconnect terminal disposed in the second housing, the second interconnect terminal accessible from an exterior of the second housing, the other of the line-side terminal or the load-side terminal disposed in the second housing, at least one electrical component disposed in the second housing, the at least one electrical component electrically connected between the second interconnect terminal and the other of the line-side terminal or the load-side terminal, the at least one electrical component operative to provide at least one of a status of the modular disconnect switch or electrical protection of the modular disconnect switch, wherein the first housing and the second housing are complimentary and selectively engageable with each other to complete an electrical connection between the line-side terminal and the load-side terminal through the at least one circuit protection or control device, the first interconnect terminal, the second interconnect terminal and the at least one electrical component, wherein the at least one circuit protection or control device comprises a switch movable between an OFF position and an ON position and at least one switchable contact selectively positionable in an open position and a closed position to respectively disconnect or connect an electrical connection between the first interconnect terminal and the one of the line-side terminal or the load-side terminal, wherein movement of the switch to the OFF position moves the at least one switchable contact to electrically disconnect the first interconnect terminal from the one of the line-side terminal or the load-side terminal, and wherein movement of the switch to the ON position moves the at least one switchable contact to electrically connect the first interconnect terminal to the one of the line-side terminal or the load-side terminal.

11. The modular disconnect switch according to claim 10, wherein the at least one switchable contact comprises a first conductor having a first contact pair electrically in series with each other and a second conductor having a second contact pair electrically in series with each other, the second conductor arranged parallel to the first conductor, wherein at least one of the first conductor or the second conductor is moveable relative to the other of the first conductor or the second conductor to selectively couple the first contact pair with the second contact pair to form a parallel current path through the first conductor and the second conductor, and wherein at least one of the first conductor or the second conductor is electrically connected to the first interconnect terminal.

12. The modular disconnect switch according to claim 10, wherein the at least one electrical component comprises a first fuse contact member and a second fuse contact member, each of the first fuse contact member and the second fuse contact member configured to engage and complete an electrical connection through an overcurrent protection fuse, the first fuse contact member and the second fused contact member between the second interconnect terminal and the other of the line-side terminal or the load-side terminal.

13. The modular disconnect switch according to claim 5, wherein the at least one electrical component comprises a fuse carrier selectively securable within the receptacle based on an angular orientation of the fuse carrier relative to the receptacle.

14. The modular disconnect switch according to claim 13, wherein the fuse carrier comprises a tab configured to cooperate with the latch, wherein when the fuse carrier is secured in the receptacle the tab engages the latch to an unlocked position and enables movement of the switch to the ON position.

15. The modular disconnect switch according to claim 8, wherein the fuse carrier comprises a slot configured to cooperate with the pin, and when the fuse carrier is secured in the receptacle and the switch is in the ON position the pin engages the slot to inhibit rotation of the fuse carrier relative to the receptacle.

16. The modular disconnect switch according to claim 15, wherein the slot comprises a J-slot.

17. A protection module of a modular disconnect switch assembly, comprising:

a housing;

an interconnect terminal disposed in the housing;

one of a line-side terminal or a load-side terminal disposed in the housing;

a receptacle including first and second terminals disposed in the housing for receiving a circuit protection element, the first terminal connected to the interconnect terminal and the second terminal connected to the one of the line-side terminal or the load-side terminal; and an interlock operatively coupled to the receptacle and extending at least partially outside the housing, the interlock configured to cooperate with an actuator of an another module of the modular disconnect switch to selectively enable or inhibit access to the receptacle, wherein the housing is configured to be complimentarily engageable with a housing of the another module to complete an electrical connection through the one of the line-side terminal or the load-side terminal, the circuit protection element, and the interconnect terminal to provide protected electrical power into the another module.

18. A modular disconnect switch, comprising:

a first module comprising a first housing, a first interconnect terminal disposed in the first housing, the first interconnect terminal accessible from an exterior of the first housing, one of a line-side terminal or a load-side terminal disposed in the first housing, and a first circuit protection element disposed in the first housing, the first circuit protection element electrically connected between the first interconnect terminal and the one of the line-side terminal or the load-side terminal, the first circuit protection element operable to automatically disconnect an electrical connection between the first interconnect terminal and the one of the line-side terminal or the load-side terminal; and a second module comprising a second housing different from the first housing, a second interconnect terminal disposed in the second housing, the second interconnect terminal accessible from an exterior of the second housing, the other of the line-side terminal or the load-side terminal disposed in the second housing, a second circuit protection element disposed in the second housing, the second circuit protection element electrically connected between the second interconnect terminal and the other of the line-side terminal or the load-side terminal, the second circuit protection element operative to automatically disconnect an electrical connection between the second interconnect terminal and the other of the line-side terminal or the load-side terminal, wherein the first housing and the second housing are complimentary and selectively engageable with each other to complete an electrical connection between the line-side terminal and the load-side terminal through the first circuit protection element, the first interconnect terminal, the second interconnect terminal and the second circuit protection element.

19. The modular disconnect switch according to claim 18, wherein the first circuit protection element comprises an overload element and the second circuit protection element comprises a fuse.

* * * * *